US011482696B2

(12) United States Patent
Oakes et al.

(10) Patent No.: US 11,482,696 B2
(45) Date of Patent: Oct. 25, 2022

(54) METHOD OF COATING AN ELECTRICAL CURRENT COLLECTOR AND ELECTRODES RESULTING THEREFROM

(71) Applicant: PPG Industries Ohio, Inc., Cleveland, OH (US)

(72) Inventors: Landon J. Oakes, Cambridge, MA (US); Haley L. Orler, Bridgeville, PA (US); Elizabeth A. Furar, Pittsburgh, PA (US); Stuart D. Hellring, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 41 days.

(21) Appl. No.: 16/801,507

(22) Filed: Feb. 26, 2020

(65) Prior Publication Data

US 2021/0265608 A1    Aug. 26, 2021

(51) Int. Cl.
*H01M 4/00* (2006.01)
*H01M 4/04* (2006.01)
(Continued)

(52) U.S. Cl.
CPC ......... *H01M 4/0404* (2013.01); *H01M 4/623* (2013.01); *H01M 4/661* (2013.01);
(Continued)

(58) Field of Classification Search
CPC ......... H01M 4/0404; H01M 2004/027; H01M 4/663; H01M 4/661; H01M 4/623
See application file for complete search history.

(56) References Cited

U.S. PATENT DOCUMENTS

| 4,514,552 A | 4/1985 | Shay et al. |
| 4,786,565 A | 11/1988 | Shirai |
| (Continued) |

FOREIGN PATENT DOCUMENTS

| EP | 0226097 | 5/1990 |
| EP | 1384771 | 1/2004 |
| (Continued) |

OTHER PUBLICATIONS

Acrysol ASE-60 ER Rheology Modifier TDS, Dow Coating Materials, 843-02066-01-0320-DOW, 2 pages.
(Continued)

*Primary Examiner* — Cynthia H Kelly
*Assistant Examiner* — Monique M Wills
(74) *Attorney, Agent, or Firm* — Charles M. Yeomans

(57) ABSTRACT

The present invention is directed to a method of coating an electrical current collector comprising treating a portion of a surface of the electrical current collector with an adhesion promoting composition to deposit a treatment layer over the portion of the surface of the electrical current collector, wherein the resulting surface of the electrical current collector comprises (a) a treated portion comprising the treatment layer and (b) a non-treated portion that lacks the treatment layer; electrodepositing an electrodeposited coating layer from an electrodepositable coating composition onto the surface of the electrical current collector to form a coated electrical current collector; and rinsing the coated electrical current collector, wherein the electrodeposited coating layer substantially adheres to the treated portion of the surface and does not adhere to the non-treated portion of the surface. Also disclosed are electrodes and electrical storage devices.

34 Claims, 1 Drawing Sheet

(51) Int. Cl.
*H01M 4/62* (2006.01)
*H01M 4/66* (2006.01)
*H01M 4/02* (2006.01)

(52) U.S. Cl.
CPC ........... *H01M 4/663* (2013.01); *H01M 4/669* (2013.01); *H01M 2004/027* (2013.01)

(56) References Cited

U.S. PATENT DOCUMENTS

| | | | |
|---|---|---|---|
| 5,192,592 | A | 3/1993 | Shay |
| 5,837,766 | A | 11/1998 | Metro et al. |
| 5,989,747 | A * | 11/1999 | Tanaka ................ H01M 4/0433 429/231.95 |
| 7,217,443 | B2 | 5/2007 | Bobsein et al. |
| 7,842,762 | B2 | 11/2010 | Zawacky et al. |
| 9,085,713 | B2 | 7/2015 | Sedillo |
| 9,090,727 | B2 | 7/2015 | Hough et al. |
| 9,150,736 | B2 | 10/2015 | Daughenbaugh et al. |
| 9,202,638 | B2 | 12/2015 | Amin-Sanayei et al. |
| 9,228,041 | B2 | 1/2016 | Martinez-Castro et al. |
| 9,239,051 | B1 | 1/2016 | Amin-Sanayei et al. |
| 9,273,399 | B2 | 3/2016 | Hellring et al. |
| 9,520,591 | B2 | 12/2016 | Daughenbaugh et al. |
| 9,870,844 | B2 | 1/2018 | Daughenbaugh et al. |
| 9,882,216 | B2 | 1/2018 | Sasaki |
| 9,923,189 | B2 | 3/2018 | Xiao |
| 10,090,527 | B2 | 10/2018 | Sonobe |
| 2002/0168569 | A1 | 11/2002 | Barriere et al. |
| 2013/0146460 | A1 | 6/2013 | Silvernail et al. |
| 2013/0341194 | A1 | 12/2013 | Fuchsbichler et al. |
| 2015/0280239 | A1 | 10/2015 | Hellring et al. |
| 2015/0357079 | A1 | 12/2015 | Daughenbaugh et al. |
| 2016/0118664 | A1 | 4/2016 | Sonobe |
| 2016/0204439 | A1 | 7/2016 | Sonobe |
| 2016/0233548 | A1 * | 8/2016 | Yamada ................ H01M 4/525 |
| 2016/0380255 | A1 | 12/2016 | Daughenbaugh et al. |
| 2017/0125815 | A1 | 5/2017 | Amin-Sanayei et al. |
| 2017/0352886 | A1 | 12/2017 | Matsuzaki et al. |
| 2018/0137949 | A1 | 5/2018 | Daughenbaugh et al. |
| 2020/0203704 | A1 | 6/2020 | Oakes et al. |
| 2020/0203707 | A1 | 6/2020 | Hellring et al. |
| 2020/0295373 | A1 * | 9/2020 | Hellring ................ H01M 4/604 |

FOREIGN PATENT DOCUMENTS

| | | |
|---|---|---|
| EP | 2621005 | 7/2013 |
| EP | 2680349 | 1/2014 |
| JP | 2011134618 | 7/2011 |
| KR | 20130084539 | 7/2013 |
| WO | 2013037692 | 3/2013 |
| WO | 201513558 | 10/2015 |
| WO | 2014065407 | 9/2016 |
| WO | 2018160799 | 9/2018 |
| WO | 2019010443 | 1/2019 |

OTHER PUBLICATIONS

Han et al., "Cross-Linked Poly(acrylic acid) with Polycarbodiimide as Advanced Binder for Si/Graphite Composite Negative Electrodes in Li-Ion Batteries", 2013, ECS Electrochem. Lett. 2 A17, 5 pages.

Deckner, "Carbomers: Overview, Tips, & Recommendations", (2013), accessed from https://knowledge.ulprospector.com/261/pcc-carbomers on Jan. 7, 2021, 3 pages.

* cited by examiner

METHOD OF COATING AN ELECTRICAL CURRENT COLLECTOR AND ELECTRODES RESULTING THEREFROM

NOTICE OF GOVERNMENT SUPPORT

This invention was made with Government support under Government Contract No. DE-EE0007266 awarded by the Department of Energy. The United States Government has certain rights in this invention.

FIELD OF THE INVENTION

The present invention is directed towards methods of coating electrical current collectors, coated current collectors resulting therefrom, electrodes, and electrical storage devices including the same.

BACKGROUND INFORMATION

There is a trend in the electronics industry to produce smaller devices, powered by smaller and lighter batteries. Batteries with a negative electrode, such as a carbonaceous material, and a positive electrode, such as lithium metal oxides, can provide relatively high power and relatively low weight. Binders for producing such electrodes are usually combined with the negative electrode or positive electrode in the form of a solventborne or waterborne slurry that are applied to electrical current collectors to form an electrode. Once applied, the bound ingredients need to be able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move through the electrode, and lithium ion mobility requires interconnectivity within the electrode between active particles. However, solventborne slurries present safety, health and environmental dangers because many organic solvents utilized in these slurries are toxic and flammable, volatile in nature, carcinogenic, and involve special manufacturing controls to mitigate risk and reduce environmental pollution. In contrast, waterborne slurries have oftentimes produced unsatisfactory electrodes having poor adhesion and/or poor performance when included in an electrical storage device. Furthermore, conventional methods of applying the solventborne and waterborne slurries to electrical current collectors can be difficult to achieve uniform coatings or uniform coating thicknesses, particularly for non-uniform electrical current collectors or coatings, or coating to be applied in a pattern. Improved battery coating application is desired without the use of carcinogenic materials and environmental pollution.

SUMMARY OF THE INVENTION

Disclosed herein is a method of coating an electrical current collector comprising treating a portion of a surface of the electrical current collector with an adhesion promoting composition to deposit a treatment layer over the portion of the surface of the electrical current collector, wherein the resulting surface of the electrical current collector comprises (a) a treated portion comprising the treatment layer and (b) a non-treated portion that lacks the treatment layer; electrodepositing an electrodeposited coating layer from an electrodepositable coating composition onto the surface of the electrical current collector to form a coated electrical current collector; and rinsing the coated electrical current collector, wherein the electrodeposited coating layer substantially adheres to the treated portion of the surface and does not adhere to the non-treated portion of the surface.

Also disclosed herein is an electrode comprising an electrical current collector having a surface; a treatment layer on a portion of the surface of the electrical current collector, wherein (a) a portion of the surface of the electrical current collector comprises the treatment layer and (b) a portion of the surface of the electrical current collector lacks the treatment layer; and an electrodeposited coating layer that is present over the treatment layer and is not present over the portion of the surface of the electrical current collector lacks the treatment layer.

Further disclosed herein an electrical storage device comprising (a) an electrode of the present invention; (b) a counter-electrode; and (c) an electrolyte.

DETAILED DESCRIPTION OF THE INVENTION

Figure 1A:
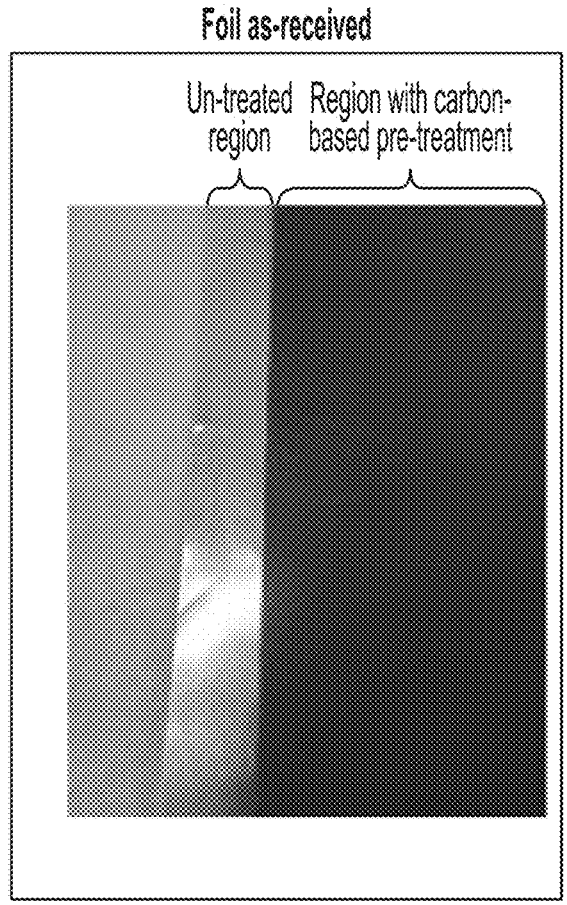
FIG. 1a is a photograph of an electrical current collector having a bare foil portion and a carbon-coated portion.

As stated above, the present invention is directed to a method of coating an electrical current collector comprising treating a portion of a surface of the electrical current collector with an adhesion promoting composition to deposit a treatment layer over the portion of the surface of the electrical current collector, wherein the resulting surface of the electrical current collector comprises (a) a treated portion comprising the treatment layer and (b) a non-treated portion that lacks the treatment layer; electrodepositing an electrodeposited coating layer from an electrodepositable coating composition onto the surface of the electrical current collector to form a coated electrical current collector; and rinsing the coated electrical current collector, wherein the electrodeposited coating layer substantially adheres to the treated portion of the surface and does not adhere to the non-treated portion of the surface.

The resulting electrical current collector coated by the method of the present invention may be an electrode, as further described herein.

The electrical current collector may comprise any suitable conductive material. For example, the electrical current collector may comprise metals, metal alloys, and/or substrates that have been metallized, such as nickel-plated plastic. Additionally, the electrical current collector may comprise non-metal conductive materials including composite materials such as, for example, materials comprising carbon fibers or conductive carbon. The electrical current collector may comprise aluminum, copper, iron, steel, stainless steel, nickel, or combinations thereof. For example, the metal or metal alloy may comprise ferrous metals such as cold rolled steel, hot rolled steel, stainless steel, steel coated with zinc metal, zinc compounds, or zinc alloys, such as electrogalvanized steel, hot-dipped galvanized steel, galvanealed steel, and steel plated with zinc alloy; aluminum and/or aluminum alloys of the 1XXX, 2XXX, 3XXX, 4XXX, 5XXX, 6XXX, 7XXX or 8XXX series as well as clad aluminum alloys and cast aluminum alloys of the A356 series; magnesium alloys of the AZ31B, AZ91C, AM60B, or EV31A series; titanium and/or titanium alloys; nickel and/or nickel alloys; and copper and/or copper alloys. Other suitable conductive materials include conductive carbon; non-woven conductive carbon; a material coated with a conductive primer coating; a pre-made battery electrode for preparation of a multi-layered battery electrode; an electrically conductive polymer; and a polymer comprising a conductive composite. The electrical current collector may also be in the form of an aluminum or copper foil or mesh. The electrical current collector may be flexible such that it could be used in a roll-to-roll coating process. For example, the electrical current collector may have flexibility similar to that of an aluminum or copper foil.

Although the shape and thickness of the current collector are not particularly limited, the current collector may have a thickness of about 0.5 to 1000 microns, such as 1 to 500 microns, such as 1 to 400 microns, such as 1 to 300 microns, such as 1 to 250 microns, such as 1 to 200 microns, such as 5 to 100 microns, such as 5 to 75 microns, such as 5 to 50 microns such as 10 to 25 microns, such as 0.5 to 100 microns, such as 0.5 to 50 microns, such as 0.5 to 25 microns, such as 0.5 to 20 microns, such as 1 to 20 microns, such as 3 to 20 microns, such as 5 to 18 microns.

According to the present invention, the method includes treating a portion of a surface of the electrical current collector with an adhesion promoting composition to deposit a treatment layer over the portion of the surface of the electrical current collector. As used herein, the term "adhesion promoting composition" refers to materials that physically or chemically modify the surface of the electrical current collector in order to improve the wet adhesion of a subsequently applied coating electrodeposited from an electrodepositable coating composition. As used herein, the term "wet adhesion" refers to the adhesion of a coating film electrodeposited from an electrodepositable coating composition after it leaves the electrocoat bath and before the coating is cured. After treatment, the resulting surface of the electrical current collector comprises (a) a treated portion comprising the treatment layer and (b) a non-treated portion that lacks the treatment layer.

As noted above, the treatment layer is present over a portion of the surface of the electrical current collector, and the treatment layer does not cover the remainder of the surface. The treatment layer may be continuous or discontinuous and may be present as a pattern or in a randomized configuration. The presence of the treatment layer results in the surface having different portions of the surface of the electrical current collector having differential wet adhesion to a subsequently applied electrodeposited coating layer. The treatment layer may comprise a single layer or may be present in the form of multiple layers. If multiple treatment layers are present, they may be the composition or have different compositions.

The adhesion promoting composition may comprise a conductive primer coating composition, and the resulting treatment layer comprises a conductive primer coating layer. The conductive primer coating composition may comprise any suitable conductive primer coating composition. For example, the conductive primer coating composition may comprise a binder and an electrically conductive agent such as carbonaceous materials. The carbonaceous material may comprise any conductive allotrope of carbon, such as, for example, graphene, carbon black (such as acetylene black and furnace black), carbon nanotubes, graphite, activated carbon, carbon fibers, and others. The binder may comprise, for example, conductive inorganic binders, organic polymer-based binders, composites, or combinations thereof. The conductive primer coating composition may comprise a carbon-based conductive primer coating composition, and the resulting conductive primer coating layer may comprise a carbon-based conductive primer coating layer.

Application of the conductive primer coating composition may be by any means known in the art. For example, the conductive primer coating composition may be applied by ordinary application methods such as brush, roller, or spray.

The thickness of the conductive primer coating film may be 0.01 microns to 50 microns in terms of dried film thickness, such as 0.01 to 10 microns, such as 0.01 to 5 microns, such as 0.0.1 to 4 microns, such as 0.01 to 3.5 microns, such as 0.01 to 3 microns, such as 0.01 to 1 micron, such as 0.10 to 25 microns, such as 0.25 to 10 microns, such as 0.25 to 5 microns, such as 0.25 to 4 microns, such as 0.25 to 3.5 microns, such as 0.5 to 3 microns, such as 1 to 2 microns.

The conductive primer may have a relatively low electrical resistance or resistivity to ensure facile electron transfer through the current collector. Resistance or resistivity can be measured through various means. One non-limiting exemplary technique to measure the impact of the conductive primer is through-plane resistance. For example, interfacial resistance may be measured by through-plane conductivity. The sample (cut into a small rectangle) can be sandwiched between two square copper plates. A SourceMeter may be used to measure the resistance in real-time while a controlled pressure is applied between the copper plates (usually 100, 300 and 500 psi). The resistance is then measured as a function of pressure until the resistance reaches a steady state. For example, in the present invention, the through-plane resistance may have a value of 0.05 to 100 $\Omega/cm^2$, such as 0.05 to 50 $\Omega/cm^2$, such as 0.05 to 25 $\Omega/cm^2$, such as 0.05 to 10 $\Omega/cm^2$, such as 0.05 to 8 $\Omega/cm^2$, such as 0.05 to 5 $\Omega/cm^2$, such as 0.05 to 4 $\Omega/cm^2$, such as 0.05 to 3 $\Omega/cm^2$, such as 0.05 to 2 $\Omega/cm^2$, such as 0.05 to 1.5 $\Omega/cm^2$, such as 0.05 to 1 $\Omega/cm^2$, such as 0.05 to 0.5 $\Omega/cm^2$, such as 0.1 to 100 $\Omega/cm^2$, such as 0.1 to 50 $\Omega/cm^2$, such as 0.1 to 25 $\Omega/cm^2$, such as 0.1 to 10, such as 0.1 to 8 $\Omega/cm^2$ $\Omega/cm^2$, such as 0.1 to 5 $\Omega/cm^2$, such as 0.1 to 4 $\Omega/cm^2$, such as 0.1 to 3 $\Omega/cm^2$, such as 0.1 to 2 $\Omega/cm^2$, such as 0.1 to 1.5 $\Omega/cm^2$, such as 0.1 to 1 $\Omega/cm^2$, such as 0.1 to 0.5 $\Omega/cm^2$.

The adhesion promoting composition may comprise a pretreatment composition, and the treatment layer comprises a pretreatment layer. As used herein, the term "pretreatment composition" refers to a composition that upon contact with the current collector, reacts with and chemically alters the current collector surface and binds to it to form a protective layer. The pretreatment composition may be a pretreatment composition comprising a group IIIB and/or IVB metal. As used herein, the term "group IIIB and/or IVB metal" refers to an element that is in group IIIB or group IVB of the CAS Periodic Table of the Elements as is shown, for example, in the Handbook of Chemistry and Physics, $63^{rd}$ edition (1983). Where applicable, the metal themselves may be used, however, a group IIIB and/or IVB metal compound may also be used. As used herein, the term "group IIIB and/or IVB metal compound" refers to compounds that include at least one element that is in group IIIB or group IVB of the CAS Periodic Table of the Elements. The group IIIB and/or IVB metal compound is present in the pretreatment composition in an amount of 20 to 5,000 ppm metal, such as 50 to 1,000 ppm metal, such as 180 to 300 ppm metal (measured as elemental metal). For example, the group IIIB and/or IVB metal compound of the pretreatment composition may comprise zirconium or a zirconium compound. Suitable compounds of zirconium include, but are not limited to, hexafluorozirconic acid, alkali metal and ammonium salts thereof, ammonium zirconium carbonate, zirconyl nitrate, zirconium carboxylates and zirconium hydroxy carboxylates, such as hydrofluorozirconic acid, zirconium acetate, zirconium oxalate, ammonium zirconium glycolate, ammonium zirconium lactate, ammonium zirconium citrate, and mixtures thereof. Non-limiting examples of suitable pretreatment compositions and methods for pretreating the electrical current collector are described in U.S. Pat. No. 9,273,399 at col. 4, line 60 to col. 10, line 26, the cited portion of which is incorporated herein by reference.

The pretreatment composition also may comprise an electropositive metal ion. As used herein, the term "electropositive metal ion" refers to metal ions that will be reduced by the metal substrate being treated when the third solution contacts the surface of the metallic substrate. As will be appreciated by one skilled in the art, the tendency of chemical species to be reduced is called the reduction potential, is expressed in volts, and is measured relative to the standard hydrogen electrode, which is arbitrarily assigned a reduction potential of zero. The reduction potential for several elements is set forth in Table 1 below (according to the CRC $82^{nd}$ Edition, 2001-2002). An element or ion is more easily reduced than another element or ion if it has a voltage value, E*, in the following table, that is more positive than the elements or ions to which it is being compared.

| Element | Reduction half-cell reaction | Voltage, E* |
|---|---|---|
| Potassium | $K^+ + e \rightarrow K$ | −2.93 |
| Calcium | $Ca^{2+} + 2e \rightarrow Ca$ | −2.87 |
| Sodium | $Na^+ + e \rightarrow Na$ | −2.71 |
| Magnesium | $Mg^{2+} + 2e \rightarrow Mg$ | −2.37 |
| Aluminum | $Al^{3+} + 3e \rightarrow Al$ | −1.66 |
| Zinc | $Zn^{2+} + 2e \rightarrow Zn$ | −0.76 |
| Iron | $Fe^{2+} + 2e \rightarrow Fe$ | −0.45 |
| Nickel | $Ni^{2+} + 2e \rightarrow Ni$ | −0.26 |
| Tin | $Sn^{2+} + 2e \rightarrow Sn$ | −0.14 |
| Lead | $Pb^{2+} + 2e \rightarrow Pb$ | −0.13 |
| Hydrogen | $2H^+ + 2e \rightarrow H_2$ | −0.00 |
| Copper | $Cu^{2+} + 2e \rightarrow Cu$ | 0.34 |
| Mercury | $Hg_2^{2+} + 2e \rightarrow 2Hg$ | 0.80 |
| Silver | $Ag^+ + e \rightarrow Ag$ | 0.80 |
| Gold | $Au^{3+} + 3e \rightarrow Au$ | 1.50 |

Thus, as will be apparent, when the metal substrate comprises one of the materials listed earlier, such as cold rolled steel, hot rolled steel, steel coated with zinc metal, zinc compounds, or zinc alloys, hot-dipped galvanized steel, galvanealed steel, steel plated with zinc alloy, aluminum alloys, aluminum plated steel, aluminum alloy plated steel, magnesium and magnesium alloys, suitable electropositive metal ions for deposition thereon include, for example, nickel, copper, silver, and gold, as well mixtures thereof.

According to the present invention, when the electropositive metal ion comprises copper, both soluble and insoluble compounds may serve as a source of copper ions in the third compositions.

The electropositive metal ion may be present in the pretreatment composition in an amount of at least 2 ppm (calculated as metal ion), based on the total weight of the pretreatment composition, from 2 ppm to 100 ppm, such as from 4 ppm to 80 ppm, such as from 6 ppm to 60 ppm, such as from 8 ppm to 40 ppm. The amount of electropositive metal ion in the third composition can range between the recited values inclusive of the recited values.

For example, the electrical current collector may optionally first be rinsed with a solution of fluoride to etch the surface thereof. The step of rinsing the electrical current collector with a fluoride solution may remove oxide layers and/or increase the surface area of the electrical current collector, and, in the case of aluminum foils, may remove the less reactive aluminum oxide surface layers to expose a more reactive aluminum surface to thereby enhance deposition of the pretreatment layer. Next, the electrical current collector may be contacted with the pretreatment composition. The pretreatment composition may comprise a carrier, often an aqueous medium, so that the composition is in the form of a solution or dispersion of a group IIIB or IVB metal compound in the carrier. The solution or dispersion may be brought into contact with the electrical current collector by any of a variety of known techniques, such as dipping or immersion, spraying, intermittent spraying, dipping followed by spraying, spraying followed by dipping, brushing, or roll-coating. The solution or dispersion when applied to the conductive substrate may be at a temperature ranging from 40 to 185° F. (4.4 to 85° C.), 60 to 150° F. (15 to 65° C.), such as 60 to 110° F. (15 to 43.3° C.), such as 70 to 90° F. (21.1 to 32.2° C.). The contact time is often from 5 seconds to 15 minutes, such as 10 seconds to 10 minutes, such as 10 seconds to five minutes, such as 15 seconds to 3 minutes, such as 30 seconds to 2 minutes. Following contact with the pretreatment composition, the substrate optionally may be rinsed with water and dried.

As mentioned above, the method of the present invention further comprises electrodepositing an electrodeposited coating layer from an electrodepositable coating composition onto the surface of the electrical current collector to form a coated electrical current collector.

The method of the present invention further comprises electrodepositing an electrodeposited coating layer from an electrodepositable coating composition onto the surface of the electrical current collector to form a coated electrical current collector may comprise at least partially immersing the electrical current collector into a bath comprising an electrodepositable coating composition, and electrodepositing a coating deposited from the electrodepositable coating composition onto at least a portion of the electrical current collector immersed in the bath.

In the electrodeposition process of the method of the invention, the electrical current collector serves as an electrode in electrical communication with a counter-electrode which are both immersed (at least partially) in a bath comprising an electrodepositable coating composition. The electrical current collector may serve as an anode in anionic electrodeposition or a cathode in cationic electrodeposition. During electrodeposition, an electric current is passed between the electrodes to cause the solid components of the electrodepositable coating composition to migrate towards the electrical current collector and deposit as a continuous film on the surface thereof. The applied voltage may be varied and can be, for example, as low as one volt to as high as several thousand volts but is often between 1 to 500V, such as 1 to 400V, such as 1 to 300V, such as 1 to 250V, such as 5 to 250V, such as 5 to 200V, such as 5 to 150V, such as 5 to 100V, such as 50 and 500V. The current density is often between 0.5 and 15 amperes per square foot. The residence time of the applied electrical potential may be from 1 to 180 seconds, such as 2 to 90 seconds, such as 3 to 45 seconds, such as 4 to 35 seconds, such as 5 to 30 seconds. Once the coating is deposited, the electrical current collector is removed from the bath. The entire electrically conductive surface of the electrical current collector that was immersed in the electrodepositable coating composition should include the electrodeposited coating layer, including (a) the treated portion comprising the treatment layer and (b) the non-treated portion that lacks the treatment layer.

As used herein, the term "electrodepositable coating composition" refers to a composition that is capable of being deposited onto an electrically conductive substrate under the influence of an applied electrical potential. The electrodepositable coating composition used to produce the coating on the electrical current collector comprises an electrochemically active material and an electrodepositable binder, and the electrodeposited coating layer derived therefrom comprises the same.

The electrochemically active material may comprise a material for use as an active material for a positive electrode such that the formed electrode is a positive electrode. For example, the electrochemically active material may comprise a material capable of incorporating lithium (including incorporation through lithium intercalation/deintercalation), a material capable of lithium conversion, or combinations thereof. Non-limiting examples of electrochemically active materials capable of incorporating lithium include $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, and combinations thereof. Non-limiting examples of materials capable of lithium conversion include $LiO_2$, $FeF_2$ and $FeF_3$, aluminum, $Fe_3O_4$, and combinations thereof.

The electrochemically active material may comprise a material for use as an active material for a negative electrode such that the formed electrode is a negative electrode. For example, the electrochemically active material may comprise graphite, lithium titanate (LTO), lithium vanadium phosphate (LVP), silicon compounds, tin, tin compounds, sulfur, sulfur compounds, or a combination thereof.

The electrochemically active material may optionally comprise a protective coating. The protective coating may comprise, for example, metal compounds or complexes such as (i) a metal chalcogen, such as a metal oxide, metal sulfide, or metal sulfate; (ii) a metal pnictogen, such as a metal nitride; (iii) a metal halide, such as a metal fluoride; (iv) a metal oxyhalide, such as a metal oxyflouride; (v) a metal oxynitride; (vi) a metal phosphate; (vi) a metal carbide; (vii) a metal oxycarbide; (viii) a metal carbonitride; (ix) olivine(s); (x) NaSICON structure(s); (xi) polymetallic ionic structure(s); (xii) metal organic structure(s) or complex(es); (xiii) polymetallic organic structure(s) or complex(es); or (xiv) a carbon-based coating such as a metal carbonate. Metals that may be used to form the metal compounds or complexes include: alkali metals; transition metals; lanthanum; silicon; tin; germanium; gallium; aluminum; and indium. The metal may also be compounded with boron and/or carbon. The protective coating may comprise, for example, non-metal compounds or complexes such as (i) a non-metal oxide; (ii) a non-metal nitride; (iii) a non-metal carbonitride; (iv) a non-metal fluoride; (v) a non-metallic organic structures or complexes; (vi) or a non-metal oxyfluoride. For example, the protective coating may comprise titania, alumina, silica, zirconia, or lithium carbonate.

The electrochemically active material may be present in the electrodepositable coating composition and electrodeposited coating layer formed therefrom in amount of at least 45% by weight, such as at least 70% by weight, such as at least 80% by weight, such as at least 90% by weight, such as at least 91% by weight, and may be present in an amount of no more than % by weight, such as no more than 99% by weight, such as no more than 98% by weight, such as no more than 95% by weight, based on the total solids weight of the electrodepositable composition or electrodeposited coating layer. The electrochemically active material may be present in the electrodepositable coating composition and electrodeposited coating layer formed therefrom in amount of 45% to 99% by weight, such as 50% to 99%, such as 55% to 99%, such as 60% to 99%, such as 65% to 99%, such as 70% to 98% by weight, such as 80% to 98% by weight, such as 90% to 98% by weight, such as 91% to 98% by weight, such as 91% to 95% by weight, such as 94% to 98% by weight, such as 95% to 98% by weight, such as 96% to 98% by weight, based on the total solids weight of the electrodepositable coating composition or electrodeposited coating layer.

The electrodepositable coating composition and electrodeposited coating layer formed therefrom further comprises an electrodepositable binder. The electrodepositable binder serves to bind together particles of the electrodepositable coating composition, such as the electrochemically active material and other optional materials, upon electrodeposition of the coating composition onto a substrate. As used herein, the term "electrodepositable binder" refers to binders that are capable of being deposited onto a conductive substrate by the process of electrodeposition. The electrodepositable binder may comprise a film-forming polymer and may optionally further comprise a curing agent that reacts with the film-forming polymer to cure to the electrodeposited coating composition, in addition to other optional components. The electrodepositable binder is not particularly limited so long as the electrodepositable binder is capable of being deposited onto a conductive substrate by the process of electrodeposition, and a suitable binder may be selected according to the type of electrical storage device of interest.

The film-forming resin of the electrodepositable binder may comprise an ionic film-forming resin. As used herein, the term "ionic film-forming resin" refers to any film-forming resin that carries a charge, including resins that carry a negatively charged (anionic) ion and resins that carry a positively charged (cationic) ion. Suitable ionic resins include, therefore, anionic resins and cationic resins. As will be understood by those skilled in the art, anionic resins are typically employed in anionic electrodepositable coating compositions where the substrate to be coated serves as the anode in the electrodepositable bath and cationic resins are typically employed in cationic electrodepositable coating compositions where the substrate to be coated serves as the cathode in the electrodepositable bath. As described in more detail below, the ionic resin may comprise salt groups comprising the ionic groups of the resin such that the anionic or cationic resins comprise anionic salt group-containing or cationic salt group-containing resins, respectively. Non-limiting examples of resins that are suitable for use as the ionic film-forming resin in the present invention include alkyd resins, acrylics, methacrylics, polyepoxides, polyamides, polyurethanes, polyureas, polyethers, and polyesters, among others.

The ionic film-forming resin may optionally comprise active hydrogen functional groups. As used herein, the term "active hydrogen functional groups" refers to those groups that are reactive with isocyanates as determined by the Zerewitinoff test described in the JOURNAL OF THE AMERICAN CHEMICAL SOCIETY, Vol. 49, page 3181

(1927), and include, for example, hydroxyl groups, primary or secondary amino groups, carboxylic acid groups, and thiol groups.

As discussed above, the ionic resin may comprise an anionic salt group-containing resin. Suitable anionic resins include resins comprise anionic groups, such as acid groups, such as carboxylic acid groups or phosphorous acid groups, which impart a negative charge that may be at least partially neutralized with a base to form the anionic salt group-containing resin. An anionic salt group-containing resin that comprises active hydrogen functional groups may be referred to as an active hydrogen-containing, anionic salt group-containing resin.

The electrodepositable binder may comprise an ionic cellulose derivative, such as an anionic cellulose derivative. Non-limiting examples of anionic cellulose derivatives includes carboxymethylcellulose and salts thereof (CMC). CMC is a cellulosic ether in which a portion of the hydroxyl groups on the anhydroglucose rings are substituted with carboxymethyl groups. The cellulose derivative may have a weight average molecular weight of 50,000 and 2,000,000 g/mol, such as 50,000 to 1,000,000 g/mol, such as 100,000 to 700,000 g/mol, such as 150,000 to 600,000 g/mol, such as 200,000 to 500,000 g/mol, such as 200,000 to 300,000 g/mol, such as 400,000 to 500,000 g/mol. Non-limiting examples of anionic cellulose derivatives include those described in U.S. Pat. No. 9,150,736, at col. 4, line 20 through col. 5, line 3, the cited portion of which is incorporated herein by reference.

Examples of (meth)acrylic polymers are those which are prepared by polymerizing mixtures of (meth)acrylic monomers. The anionic (meth)acrylic polymer may comprise carboxylic acid moieties that are introduced into the polymer from the use of (meth)acrylic carboxylic acids. Non-limiting examples of suitable anionic (meth)acrylic polymers include those described in U.S. Pat. No. 9,870,844, at col. 3, line 37 through col. 6, line 67, the cited portion of which is incorporated herein by reference.

Non-limiting examples of other anionic resins that are suitable for use in the compositions described herein include those described in U.S. Pat. No. 9,150,736, at col. 5, lines 4-41, the cited portion of which is incorporated herein by reference.

As mentioned above, in adapting an anionic resin to be solubilized or dispersed in an aqueous medium, it is often at least partially neutralized with a base. Suitable bases include both organic and inorganic bases. Non-limiting examples of suitable bases include ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholine, e.g., N-methylmorpholine or N-ethylmorpholine. Non-limiting examples of suitable inorganic bases include the hydroxide, carbonate, bicarbonate, and acetate bases of alkali or alkaline metals (e.g., $H_3C(CR_1R_2)CO_2M$, wherein $R_1$ and $R_2$ can be hydrogen, alkyl, alkanols, alkylamins, etc., and M=alkali or alkaline metal), specific examples of which include potassium hydroxide, lithium hydroxide, and sodium hydroxide. The resin(s) may be at least partially neutralized from 20 to 200 percent, such as 40 to 150 percent, such as 60 to 120 percent of theoretical neutralization, based upon the total number of anionic groups present in the resin.

As discussed above, the ionic resin may comprise a cationic salt group-containing resin. Suitable cationic salt-group containing resins include resins that contain cationic groups, such as sulfonium groups and cationic amine groups, which impart a positive charge that may be at least partially neutralized with an acid to form the cationic salt group-containing resin. A cationic salt group-containing resin that comprises active hydrogen functional groups may be referred to as an active hydrogen-containing, cationic salt group-containing resin.

Non-limiting examples of cationic resins that are suitable for use in the compositions described herein include those described in U.S. Pat. No. 9,150,736, at col. 6, line 29 through col. 8, line 21, the cited portion of which is incorporated herein by reference.

As will be appreciated, in adapting the cationic resin to be solubilized or dispersed in an aqueous medium, the resin may be at least partially neutralized by, for example, treating with an acid. Non-limiting examples of suitable acids are inorganic acids, such as phosphoric acid and sulfamic acid, as well as organic acids, such as, acetic acid and lactic acid, among others. Besides acids, salts such as dimethylhydroxyethylammonium dihydrogenphosphate and ammonium dihydrogenphosphate can be used. The cationic resin may be neutralized to the extent of at least 30%, such as at least 40%, such as at least 50%, such as at least 60%, such as at least 70%, of the total theoretical neutralization equivalent of the cationic polymer based on the total number of cationic groups. The step of solubilization or dispersion may be accomplished by combining the neutralized or partially neutralized resin with the aqueous medium.

The electrodepositable binder may optionally comprise a pH-dependent rheology modifier. The pH-dependent rheology modifier may comprise a portion of or all of the film-forming polymer and/or binder. As used herein, the term "pH-dependent rheology modifier" refers to an organic compound, such as a molecule, oligomer or polymer, that has a variable rheological effect based upon the pH of the composition. The pH-dependent rheology modifier may affect the viscosity of the composition on the principle of significant volume changes of the pH-dependent rheology modifier induced by changes in the pH of the composition. For example, the pH-dependent rheology modifier may be soluble at a pH range and provide certain rheological properties and may be insoluble and coalesce at a critical pH value (and above or below based upon the type of pH-dependent rheology modifier) which causes a reduction in the viscosity of the composition due to a reduction in the volume of the rheology modifier. The relationship between the pH of the composition and viscosity due to the presence of the pH-dependent rheology modifier may be non-linear. The pH-dependent rheology modifier may comprise an alkali-swellable rheology modifier or an acid swellable rheology modifier, depending upon the type of electrodeposition that the electrodepositable coating composition is to be employed. For example, alkali-swellable rheology modifiers may be used for anionic electrodeposition, whereas acid swellable rheology modifiers may be used for cathodic electrodeposition.

The use of the pH-dependent rheology modifier in the electrodepositable binder in the amounts herein may assist in the production of electrodes by electrodeposition. The pH-dependent rheology modifier may comprise ionic groups and/or ionic salt groups, but such groups are not required. Without intending to be bound by any theory, it is believed that the pH dependence of the rheology modifier assists in the electrodeposition of the electrodepositable coating composition because the significant difference in pH of the electrodeposition bath at the surface of the substrate to be coated relative to the remainder of the electrodeposition bath causes the pH-dependent rheology modifier to undergo a significant reduction in volume at, or in close proximity to, the surface of the substrate to be coated inducing coalescence of the pH-dependent rheology modifier, along with the other components of the electrodepositable coating composition, on the surface of the substrate to be coated. For example, the pH at the surface of the anode in anodic electrodeposition is significantly reduced relative to the remainder of the electrodeposition bath. Likewise, the pH at the surface cathode in cathodic electrodeposition is significantly higher than the rest of the electrodeposition bath. The difference in pH at the surface of the electrode to be coated during electrodeposition relative to the electrodeposition bath in a static state may be at least 6 units, such as at least 7 units, such as at least 8 units.

As used herein, the term "alkali-swellable rheology modifier" refers to a rheology modifier that increases the viscosity of a composition (i.e., thickens the composition) as the pH of the composition increases. The alkali-swellable rheology modifier may increase viscosity at a pH of about 2.5 or greater, such as about 3 or greater, such as about 3.5 or greater, such as about 4 or greater, such as about 4.5 or greater, such as about 5 or greater.

Non-limiting examples of alkali-swellable rheology modifiers include alkali-swellable emulsions (ASE), hydrophobically modified alkali-swellable emulsions (HASE), star polymers, and other materials that provide pH-triggered rheological changes at low pH, such as the pH values described herein. The alkali-swellable rheology modifiers may comprise addition polymers having constitutional units comprising the residue of ethylenically unsaturated monomers. For example, the alkali-swellable rheology modifiers may comprise addition polymers having constitutional units comprising, consisting essentially of, or consisting of the residue of: (a) 2 to 70% by weight of a monoethylenically unsaturated carboxylic acid, such as 20 to 70% by weight, such as 25 to 55% by weight, such as 35 to 55% by weight, such as 40 to 50% by weight, such as 45 to 50% by weight; (b) 20 to 80% by weight of a $C_1$ to $C_6$ alkyl (meth)acrylate, such as 35 to 65% by weight, such as 40 to 60% by weight, such as 40 to 50% by weight, such as 45 to 50% by weight; and at least one of (c) 0 to 3% by weight of a crosslinking monomer, such as 0.1 to 3% by weight, such as 0.1 to 2% by weight; and/or (d) 0 to 60% by weight of a monoethylenically unsaturated alkyl alkoxylate monomer, such as 0.5 to 60% by weight, such as 10 to 50% by weight, the % by weight being based on the total weight of the addition polymer. The ASE rheology modifiers may comprise (a) and (b) and may optionally further comprise (c), and the HASE rheology modifiers may comprise (a), (b) and (d), and may optionally further comprise (c). When (c) is present, the pH-dependent rheology modifier may be referred to as a crosslinked pH-dependent rheology modifier. When the acid groups have a high degree of protonation (i.e., are unneutralized) at low pH, the rheology modifier is insoluble in water and does not thicken the composition, whereas when the acid is substantially deprotonated (i.e., substantially neutralized) at higher pH values, the rheology modifier becomes soluble or dispersible (such as micelles or microgels) and thickens the composition.

The (a) monoethylenically unsaturated carboxylic acid may comprise a $C_3$ to $C_8$ monoethylenically unsaturated carboxylic acid such as acrylic acid, methacrylic acid, and the like, as well as combinations thereof.

The (b) $C_1$ to $C_8$ alkyl (meth)acrylate may comprise a $C_1$ to $C_6$ alkyl (meth)acrylate, such as a $C_1$ to $C_4$ alkyl (meth)acrylate. The $C_1$ to $C_8$ alkyl (meth)acrylate may comprise a non-substituted $C_1$ to $C_8$ alkyl (meth)acrylate such as, for example, methyl (meth)acrylate, ethyl (meth)acrylate, propyl (meth) acrylate, isopropyl (meth)acrylate, butyl (meth) acrylate, isobutyl (meth)acrylate, pentyl (meth)acrylate, isopentyl (meth)acrylate, hexyl (meth)acrylate, heptyl (meth) acrylate, isoheptyl (meth)acrylate, 2-ethylhexyl (meth) acrylate, or combinations thereof.

The (c) crosslinking monomer may comprise a polyethylenically unsaturated monomer such as ethylene glycol di(meth)acrylate, 1,6-hexanediol di(meth)acrylate, divinylbenzene, trimethylolpropane diallyl ether, tetraallyl pentaerythritol, triallyl pentaerythritol, diallyl pentaerythritol, diallyl phthalate, triallyl cyanurate, bisphenol A diallyl ether, methylene bisacrylamide, allyl sucroses, and the like, as well as combinations thereof.

The (d) monoethylenically unsaturated alkylated ethoxylate monomer may comprise a monomer having a polymerizable group, a hydrophobic group and a bivalent polyether group of a poly(alkylene oxide) chain, such as a poly(ethylene oxide) chain having about 5-150 ethylene oxide units, such as 6-10 ethylene oxide units, and optionally 0-5 propylene oxide units. The hydrophobic group is typically an alkyl group having 6-22 carbon atoms (such as a dodecyl group) or an alkaryl group having 8-22 carbon atoms (such as octyl phenol). The bivalent polyether group typically links the hydrophobic group to the polymerizable group. Examples of the bivalent polyether group linking group and hydrophobic group are a bicycloheptyl-polyether group, a bicycloheptenyl-polyether group or a branched $C_5$-$C_{50}$ alkyl-polyether group, wherein the bicycloheptyl-polyether or bicycloheptenyl-polyether group may optionally be substituted on one or more ring carbon atoms by one or two $C_1$-$C_6$ alkyl groups per carbon atom.

In addition to the monomers described above, the pH-dependent rheology modifier may comprise other ethylenically unsaturated monomers. Examples thereof include substituted alkyl (meth)acrylate monomers substituted with functional groups such as hydroxyl, amino, amide, glycidyl, thiol, and other functional groups; alkyl (meth)acrylate monomers containing fluorine; aromatic vinyl monomers; and the like. Alternatively, the pH-dependent rheology modifier may be substantially free, essentially free, or completely free of such monomers. As used herein, a pH-dependent rheology modifier is substantially free or essentially free of a monomer when constitutional units of that monomer are present, if at all, in an amount of less than 0.1% by weight or less than 0.01% by weight, respectively, based on the total weight of the pH-dependent rheology modifier.

The pH-dependent rheology modifier may be substantially free, essentially free, or completely free of amide, glycidyl or hydroxyl functional groups. As used herein, a pH-dependent rheology modifier if substantially free or essentially free of amide, glycidyl or hydroxyl functional groups if such groups are present, if at all, in an amount of less than 1% or less than 0.1% based on the total number of functional groups present in the pH-dependent rheology modifier.

The pH-dependent rheology modifier may comprise, consist essentially of, or consist of constitutional units of the residue of methacrylic acid, ethyl acrylate and a crosslinking monomer, present in the amounts described above.

The pH-dependent rheology modifier may comprise, consist essentially of, or consist of constitutional units of the residue of methacrylic acid, ethyl acrylate and a monoethylenically unsaturated alkyl alkoxylate monomer, present in the amounts described above.

The pH-dependent rheology modifier may comprise, consist essentially of, or consist of methacrylic acid, ethyl acrylate, a crosslinking monomer and a monoethylenically unsaturated alkyl alkoxylate monomer, present in the amounts described above.

Commercially available pH-dependent rheology modifiers include alkali-swellable emulsions such as ACRYSOL ASE-60, hydrophobically modified alkali-swellable emulsions such as ACRYSOL HASE TT-615, and ACRYSOL DR-180 HASE, each of which are available from the Dow Chemical Company, and star polymers, including those produced by atom transfer radical polymerization, such as fracASSIST® prototype 2 from ATRP Solutions.

Exemplary viscosity data showing the impact of the alkali-swellable rheology modifier across a range of pH values of a composition was obtained for some non-limiting examples of alkali-swellable rheology modifiers using a Brookfield viscometer operated at 20 RPMs and using a #4 spindle. The alkali-swellable rheology modifiers ACRYSOL ASE-60, ACRYSOL HASE TT-615, and ACRYSOL DR-180 HASE were characterized at 4.25% solids in a solution of deionized water. A star polymer (fracASSIST® prototype 2) was investigated at 0.81% solids due to the limited solubility of the polymer at low pH. The pH was adjusted through the addition of dimethyl ethanolamine ("DMEA"). The viscosity measurements in centipoise (cps) across the range of pH values is provided below in Table 1.

increase of at least 1,000 cps when measured from about pH 4 to about pH 7, such as at least 1,500 cps, such as at least 1,900 cps, such as at least 5,000 cps, such as at least 10,000 cps, such as at least 15,000 cps, such as at least 17,000 cps, as measured using a Brookfield viscometer using a #4 spindle and operated at 20 RPMs. A composition of water and an alkali-swellable rheology modifier at 4.25% by weight of the total composition may result in a corresponding decrease in the viscosity of the composition over a corresponding decrease in pH value.

As shown in Table 1, a 4.25% by weight solution of the alkali-swellable rheology modifier, the % by weight based on the total weight of the solution, may have a viscosity increase of at least 1,000 cps when measured from about pH 4 to about pH 6.5, such as at least 1,500 cps, such as at least 1,900 cps, such as at least 5,000 cps, such as at least 10,000 cps, such as at least 15,000 cps, such as at least 17,000 cps, as measured using a Brookfield viscometer using a #4 spindle and operated at 20 RPMs. A composition of water and an alkali-swellable rheology modifier at 4.25% by weight of the total composition may result in a corresponding decrease in the viscosity of the composition over a corresponding decrease in pH value.

As shown in Table 1, a composition of water and an alkali-swellable rheology modifier of an star polymer at 0.81% by weight of the total composition may have a viscosity increase of at least 400 cps when measured from about pH 4 to about pH 6.5, such as at least 600 cps, such as at least 800 cps, such as at least 1,000 cps, such as at least

TABLE 1

| | Rheology Modifier | | | | | | | |
|---|---|---|---|---|---|---|---|---|
| | ACRYSOL ASE-60 | | ACRYSOL HASE-TT-615 | | fracASSIST ® prototype 2 | | ACRYSOL DR-180 HASE | |
| | pH | Viscosity | pH | Viscosity | pH | Viscosity | pH | Viscosity |
| Property | 3.53 | 0 | 4.24 | 0 | 4.04 | 0 | 4.30 | 0 |
| | 6.31 | 2,010 | 5.90 | 454 | 6.09 | 2,274 | 6.10 | 90 |
| | 6.43 | 19,280 | 6.40 | 15,600 | 7.23 | 2,352 | 6.20 | 11,160 |
| | 6.77 | 19,130 | 7.04 | Off-scale | 7.68 | 1,914 | 7.13 | Off-scale |
| | 7.42 | 17,760 | — | — | 8.72 | 1,590 | — | — |

As shown in Table 1, a composition of water and an alkali-swellable rheology modifier at 4.25% by weight of the total composition may have an increase in viscosity of at least 500 cps over an increase in pH value of 3 pH units within the pH range of 3 to 12, such as an increase of at least 1,000 cps, such as an increase of at least 2,000 cps, such as an increase of at least 3,000 cps, such as an increase of at least 5,000 cps, such as an increase of at least 7,000 cps, such as an increase of at least 8,000 cps, such as an increase of at least 9,000 cps, such as an increase of at least 10,000 cps, such as an increase of at least 12,000 cps, such as an increase of at least 14,000 cps, or more. For example, as shown for the ACRYSOL ASE-60 alkali-swellable rheology modifier in Table 1, an increase in pH from about 3.5 to about 6.5 results in an increase in the viscosity of the composition of about 19,000 cps. A composition of water and an alkali-swellable rheology modifier at 4.25% by weight of the total composition may result in a corresponding decrease in the viscosity of the composition over a corresponding decrease in pH value.

As shown in Table 1, a 4.25% by weight solution of the alkali-swellable rheology modifier, the % by weight based on the total weight of the solution, may have a viscosity 1,200 cps, such as at least 1,400 cps, such as at least 2,000 cps, such as at least 2,200 cps, as measured using a Brookfield viscometer using a #4 spindle and operated at 20 RPMs.

As used herein, the term "star polymer" refers to branched polymers with a general structure consisting of several (three or more) linear chains connected to a central core. The core of the polymer can be an atom, molecule, or macromolecule; the chains, or "arms", may include variable-length organic chains. Star-shaped polymers in which the arms are all equivalent in length and structure are considered homogeneous, and ones with variable lengths and structures are considered heterogeneous. The star polymer may comprise any functional groups that enable the star polymer to provide pH-dependent rheology modification.

As used herein, the term "acid-swellable rheology modifier" refers to a rheology modifier that is insoluble at high pH and does not thicken the composition and is soluble at lower pH and thickens the composition. The acid-swellable rheology modifier may increase viscosity at a pH of about 4 or less, such as about 4.5 or less, such as about 5 or less, such as about 6 or less.

The pH-dependent rheology modifier may be present in the electrodepositable binder in an amount of at least 10% by weight, such as at least 20% by weight, such as at least 30% by weight, such as at least 40%, such as at least 50%, such as at least 60%, such as at least 70%, such as at least 75%, such as at least 80%, such as at least 85%, such as at least 90%, such as at least 93%, such as at least 95%, such as 100%, and may be present in an amount of no more than 100% by weight, such as no more than 99% by weight, such as no more than 95% by weight, such as no more than 93% by weight, based on the total solids weight of the binder solids. The pH-dependent rheology modifier may be present in the electrodepositable binder in an amount of 10% to 100% by weight, such as 20% to 100% by weight, such as 30% to 100% by weight, 40% to 100% by weight, 50% to 100% by weight, 60% to 100% by weight, 70% to 100% by weight, 75% to 100% by weight, 80% to 100% by weight, 85% to 100% by weight, 90% to 100% by weight, 93% to 100% by weight, 95% to 100% by weight, such as 50% to 99% by weight, such as 75% to 95% by weight, such as 87% to 93% by weight, based on the total solids weight of the binder solids.

The pH-dependent rheology modifier may be present in the electrodepositable coating composition in an amount of at least 0.1% by weight, such as at least 0.2% by weight, such as at least 0.3% by weight, such as at least 1% by weight, such as at least 1.5% by weight, such as at least 2% by weight, and may be present in an amount of no more than 10% by weight, such as no more than 5% by weight, such as no more than 4.5% by weight, such as no more than 4% by weight, such as no more than 3% by weight, such as no more than 2% by weight, such as no more than 1% by weight, based on the total solids weight of the electrodepositable coating composition. The pH-dependent rheology modifier may be present in the electrodepositable coating composition in an amount of 0.1% to 10% by weight, such as 0.2% to 10% by weight, such as 0.3 to 10% by weight, such as 1% to 7% by weight, such as 1.5% to 5% by weight, such as 2% to 4.5% by weight, such as 3% to 4% by weight, based on the total solids weight of the electrodepositable coating composition.

According to the present invention, the electrodepositable binder may optionally further comprise a fluoropolymer. The fluoropolymer may comprise a portion of the electrodepositable binder of the electrodepositable coating composition. The fluoropolymer may be present in the electrodepositable coating composition will typically be dispersed and may be in the form of micelles.

The fluoropolymer may comprise a (co)polymer comprising the residue of vinylidene fluoride. A non-limiting example of a (co)polymer comprising the residue of vinylidene fluoride is a polyvinylidene fluoride polymer (PVDF). As used herein, the "polyvinylidene fluoride polymer" includes homopolymers, copolymers, such as binary copolymers, and terpolymers, including high molecular weight homopolymers, copolymers, and terpolymers. Such (co)polymers include those containing at least 50 mole percent, such as at least 75 mole %, and at least 80 mole %, and at least 85 mole % of the residue of vinylidene fluoride (also known as vinylidene difluoride). The vinylidene fluoride monomer may be copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride in order to produce the fluoropolymer of the present invention. The fluoropolymer may also comprise a PVDF homopolymer.

The fluoropolymer may comprise a high molecular weight PVDF having a weight average molecular weight of at least 50,000 g/mol, such as at least 100,000 g/mol, and may range from 50,000 g/mol to 1,500,000 g/mol, such as 100,000 g/mol to 1,000,000 g/mol. PVDF is commercially available, e.g., from Arkema under the trademark KYNAR, from Solvay under the trademark HYLAR, and from Inner Mongolia 3F Wanhao Fluorochemical Co., Ltd.

The fluoropolymer may comprise a (co)polymer comprising the residue of tetrafluoroethylene. The fluoropolymer may also comprise a polytetrafluoroethylene (PTFE) homopolymer.

The fluoropolymer may comprise a nanoparticle. As used herein, the term "nanoparticle" refers to particles having a particle size of less than 1,000 nm. The fluoropolymer may have a particle size of at least 50 nm, such as at least 100 nm, such as at least 250 nm, such as at least 300 nm, and may be no more than 999 nm, such as no more than 600 nm, such as no more than 450 nm, such as no more than 400 nm, such as no more than 300 nm, such as no more than 200 nm. The fluoropolymer nanoparticles may have a particle size of 50 nm to 999 nm, such as 100 nm to 800 nm, such as 100 nm to 600 nm, such as 250 nm to 450 nm, such as 300 nm to 400 nm, such as 100nm to 400 nm, such as 100 nm to 300 nm, such as 100 nm to 200 nm. Although the fluoropolymer may comprise a nanoparticle, larger particles and combinations of nanoparticles and larger particles may also be used. As used herein, the term "particle size" refers to average diameter of the fluoropolymer particles. The particle size referred to in the present disclosure was determined by the following procedure: A sample was prepared by dispersing the fluoropolymer onto a segment of carbon tape that was attached to an aluminum scanning electron microscope (SEM) stub. Excess particles were blown off the carbon tape with compressed air. The sample was then sputter coated with Au/Pd for 20 seconds and was then analyzed in a Quanta 250 FEG SEM (field emission gun scanning electron microscope) under high vacuum. The accelerating voltage was set to 20.00 kV and the spot size was set to 3.0. Images were collected from three different areas on the prepared sample, and ImageJ software was used to measure the diameter of 10 fluoropolymer particles from each area for a total of 30 particle size measurements that were averaged together to determine the average particle size.

The fluoropolymer may be present in the electrodepositable binder in an amount of at least 15% by weight, such as at least 30% by weight, such as at least 40% by weight, such as at least 50% by weight, such as at least 70% by weight, such as at least 80% by weight, and may be present in an amount of no more than 99% by weight, such as no more than 96% by weight, such as no more than 95% by weight, such as no more than 90% by weight, such as no more than 80%, such as no more than 70%, such as no more than 60%, based on the total weight of the binder solids. The fluoropolymer may be present in in the electrodepositable binder in amounts of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight, based on the total weight of the binder solids.

The fluoropolymer may be present in the electrodepositable coating composition in an amount of at least 0.1% by weight, such as at least 0.5% by weight, such as at least 1% by weight, such as at least 1.3% by weight, such as at least 1.6% by weight, such as at least 1.9% by weight, and may be present in an amount of no more than 10% by weight, such as no more than 7.5% by weight, such as no more than 6% by weight, such as no more than 4.5% by weight, such as no more than 3.7% by weight, such as no more than 2.9% by weight, based on the total solids weight of the electrodepositable composition. The fluoropolymer may be present in the electrodepositable coating composition in an amount of 0.1% to 10% by weight, such as 0.5% to 7.5% by weight, such as 1% to 6% by weight, such as 1.3% to 4.5% by weight, such as 1.6% to 3.7% by weight, such as 1.9% to 2.9% by weight, based on the total solids weight of the electrodepositable coating composition.

The fluoropolymer to pH-dependent rheology modifier weight ratio may be at least 1:20, such as at least 1:2, such as at least 1:1, such as at least 3:1, such as at least 4:1, such as at least 6:1, such as at least 10:1, such as at least 15:1, such as at least 19:1, and may be no more than 20:1, such as no more than 15:1, such as no more than 10:1, such as no more than 6:1, such as no more than 4:1, such as no more than 3:1, such as no more than 1:1, such as no more than 1:2, such as no more than 1:3. The fluoropolymer to pH-dependent rheology modifier weight ratio may be from 1:20 to 20:1, such as 1:2 to 15:1, such as 1:1 to 10:1, such as 3:1 to 6:1.

Alternatively, the electrodepositable coating composition may be substantially free, essentially free, or completely free of fluoropolymer. As used herein, the electrodepositable coating composition is substantially free or essentially free of fluoropolymer when fluoropolymer is present, if at all, in an amount of less than 5% by weight or less than 0.2% by weight, respectively, based on the total weight of the binder solids.

The electrodepositable binder may optionally further comprise a dispersant. The dispersant may assist in dispersing the fluoropolymer, the electrochemically active material, and/or, as described further below, the electrically conductive agent (if present) in the aqueous medium. The dispersant may comprise at least one phase that is compatible with the fluoropolymer and/or other components of the electrodepositable coating composition, such as the electrochemically active material or, if present, the electrically conductive agent and may further comprise at least one phase that is compatible with the aqueous medium. The electrodepositable coating composition may comprise one, two, three, four or more different dispersants, and each dispersant may assist in dispersing a different component of the electrodepositable coating composition. The dispersant may comprise any material having phases compatible with both a component of the solids (e.g., the electrodepositable binder, such as the fluoropolymer (if present), the electrochemically active material, and/or the electrically conductive agent) and the aqueous medium. As used herein, the term "compatible" means the ability of a material to form a blend with other materials that is and will remain substantially homogenous over time. For example, the dispersant may comprise a polymer comprising such phases. The dispersant and the fluoropolymer, if present, may not be bound by a covalent bond. The dispersant may be present in the electrodepositable coating composition in the form of a micelle. The dispersant may be in the form of a block polymer, a random polymer, or a gradient polymer, wherein the different phases of the dispersant are present in the different blocks of the polymer, are randomly included throughout the polymer, or are progressively more or less densely present along the polymer backbone, respectively. The dispersant may comprise any suitable polymer to serve this purpose. For example, the polymer may comprise addition polymers produced by polymerizing ethylenically unsaturated monomers, polyepoxide polymers, polyamide polymers, polyurethane polymers, polyurea polymers, polyether polymers, polyacid polymers, and polyester polymers, among others. The dispersant may also serve as an additional component of the electrodepositable binder of the electrodepositable coating composition.

The dispersant may comprise functional groups. The functional groups may comprise, for example, active hydrogen functional groups, heterocyclic groups, and combinations thereof. As used herein, the term "heterocyclic group" refers to a cyclic group containing at least two different elements in its ring such as a cyclic moiety having at least one atom in addition to carbon in the ring structure, such as, for example, oxygen, nitrogen or sulfur. Non-limiting examples of heterocylic groups include epoxides, lactams and lactones. In addition, when epoxy functional groups are present on the addition polymer, the epoxide functional groups on the dispersant may be post-reacted with a beta-hydroxy functional acid. Non-limiting examples of beta-hydroxy functional acids include citric acid, tartaric acid, and/or an aromatic acid, such as 3-hydroxy-2-naphthoic acid. The ring opening reaction of the epoxide functional group will yield hydroxyl functional groups on the dispersant.

When acid functional groups are present, the dispersant may have a theoretical acid equivalent weight of at least 350 g/acid equivalent, such as at least 878 g/acid equivalent, such as at least 1,757 g/acid equivalent, and may be no more than 17,570 g/acid equivalent, such as no more than 12,000 g/acid equivalent, such as no more than 7,000 g/acid equivalent. The dispersant may have a theoretical acid equivalent weight of 350 to 17,570 g/acid equivalent, such as 878 to 12,000 g/acid equivalent, such as 1,757 to 7,000 g/acid equivalent.

As mentioned above, the dispersant may comprise an addition polymer. The addition polymer may be derived from, and comprise constitutional units comprising the residue of, one or more alpha, beta-ethylenically unsaturated monomers, such as those discussed below, and may be prepared by polymerizing a reaction mixture of such monomers. The mixture of monomers may comprise one or more active hydrogen group-containing ethylenically unsaturated monomers. The reaction mixture may also comprise ethylenically unsaturated monomers comprising a heterocyclic group. As used herein, an ethylenically unsaturated monomer comprising a heterocyclic group refers to a monomer having at least one alpha, beta ethylenic unsaturated group and at least cyclic moiety having at least one atom in addition to carbon in the ring structure, such as, for example, oxygen, nitrogen or sulfur. Non-limiting examples of ethylenically unsaturated monomers comprising a heterocyclic group include epoxy functional ethylenically unsaturated monomers, vinyl pyrrolidone and vinyl caprolactam, among others. The reaction mixture may additionally comprise other ethylenically unsaturated monomers such as alkyl esters of (meth)acrylic acid and others described below.

The addition polymer may comprise a (meth)acrylic polymer that comprises constitutional units comprising the residue of one or more (meth)acrylic monomers. The (meth) acrylic polymer may be prepared by polymerizing a reaction mixture of alpha, beta-ethylenically unsaturated monomers that comprise one or more (meth)acrylic monomers and optionally other ethylenically unsaturated monomers. As used herein, the term "(meth)acrylic monomer" refers to acrylic acid, methacrylic acid, and monomers derived therefrom, including alkyl esters of acrylic acid and methacrylic acid, and the like. As used herein, the term "(meth)acrylic polymer" refers to a polymer derived from or comprising constitutional units comprising the residue of one or more (meth)acrylic monomers. The mixture of monomers may comprise one or more active hydrogen group-containing (meth)acrylic monomers, ethylenically unsaturated monomers comprising a heterocyclic group, and other ethylenically unsaturated monomers. The (meth)acrylic polymer may also be prepared with an epoxy functional ethylenically unsaturated monomer such as glycidyl methacrylate in the reaction mixture, and epoxy functional groups on the resulting polymer may be post-reacted with a beta-hydroxy functional acid such as citric acid, tartaric acid, and/or 3-hydroxy-2-naphthoic acid to yield hydroxyl functional groups on the (meth)acrylic polymer.

The addition polymer may comprise constitutional units comprising the residue of an alpha, beta-ethylenically unsaturated carboxylic acid. Non-limiting examples of alpha, beta-ethylenically unsaturated carboxylic acids include those containing up to 10 carbon atoms such as acrylic acid and methacrylic acid. Non-limiting examples of other unsaturated acids are alpha, beta-ethylenically unsaturated dicarboxylic acids such as maleic acid or its anhydride, fumaric acid and itaconic acid. Also, the half esters of these dicarboxylic acids may be employed. The constitutional units comprising the residue of the alpha, beta-ethylenically unsaturated carboxylic acids may comprise at least 1% by weight, such as at least 2% by weight, such as at least 5% by weight, and may be no more than 50% by weight, such as no more than 20% by weight, such as no more than 10% by weight, such as no more than 5% by weight, based on the total weight of the addition polymer. The constitutional units comprising the residue of the alpha, beta-ethylenically unsaturated carboxylic acids may comprise 1% to 50% by weight, 2% to 50% by weight, such as 2% to 20% by weight, such as 2% to 10% by weight, such as 2% to 5% by weight, such as 1% to 5% by weight, based on the total weight of the addition polymer. The addition polymer may be derived from a reaction mixture comprising the alpha, beta-ethylenically unsaturated carboxylic acids in an amount of 1% to 50% by weight, 2% to 50% by weight, such as 2% to 20% by weight, such as 2% to 10% by weight, such as 2% to 5% by weight, such as 1% to 5% by weight, based on the total weight of polymerizable monomers used in the reaction mixture. The inclusion of constitutional units comprising the residue of an alpha, beta-ethylenically unsaturated carboxylic acids in the dispersant results in a dispersant comprising at least one carboxylic acid group which may assist in providing stability to the dispersion.

The addition polymer may comprise constitutional units comprising the residue of an alkyl esters of (meth)acrylic acid containing from 1 to 3 carbon atoms in the alkyl group. Non-limiting examples of alkyl esters of (meth)acrylic acid containing from 1 to 3 carbon atoms in the alkyl group include methyl (meth)acrylate and ethyl (meth)acrylate. The constitutional units comprising the residue of the alkyl esters of (meth)acrylic acid containing from 1 to 3 carbon atoms in the alkyl group may comprise at least 20% by weight, such as at least 30% by weight, such as at least 40% by weight, such as at least 45% by weight, such as at least 50% by weight, and may be no more than 98% by weight, such as no more than 96% by weight, such as no more than 93% by weight, such as no more than 90% by weight, such as no more than 80% by weight, such as no more than 75% by weight, based on the total weight of the addition polymer. The constitutional units comprising the residue of the alkyl esters of (meth)acrylic acid containing from 1 to 3 carbon atoms in the alkyl group may comprise 20% to 98% by weight, such as 30% to 96% by weight, such as 30% to 90% by weight, 40% to 90% by weight, such as 40% to 80% by weight, such as 45% to 75% by weight, based on the total weight of the addition polymer. The addition polymer may be derived from a reaction mixture comprising the alkyl esters of (meth)acrylic acid containing from 1 to 3 carbon atoms in the alkyl group in an amount of 20% to 98% by weight, such as 30% to 96% by weight, such as 30% to 90% by weight, such as 30% to 93%, 40% to 90% by weight, such as 40% to 80% by weight, such as 45% to 75% by weight, based on the total weight of polymerizable monomers used in the reaction mixture.

The addition polymer may comprise constitutional units comprising the residue of an alkyl esters of (meth)acrylic acid containing from 4 to 18 carbon atoms in the alkyl group. Non-limiting examples of alkyl esters of (meth)acrylic acid containing from 4 to 18 carbon atoms in the alkyl group include butyl (meth)acrylate, hexyl (meth)acrylate, octyl (meth)acrylate, isodecyl (meth)acrylate, stearyl (meth)acrylate, 2-ethylhexyl (meth)acrylate, decyl (meth)acrylate and dodecyl (meth)acrylate. The constitutional units comprising the residue of the alkyl esters of (meth)acrylic acid containing from 4 to 18 carbon atoms in the alkyl group may comprise at least 2% by weight, such as at least 3% by weight, such as at least 5% by weight, such as at least 10% by weight, such as at least 15% by weight, such as at least 20% by weight, and may be no more than 70% by weight, such as no more than 60% by weight, such as no more than 55% by weight, such as no more than 50% by weight, such as no more than 40% by weight, such as no more than 35% by weight, based on the total weight of the addition polymer. The constitutional units comprising the residue of the alkyl esters of (meth)acrylic acid containing from 4 to 18 carbon atoms in the alkyl group may comprise 2% to 70% by weight, such as 2% to 60% by weight, such as 3% to 55% by weight, such as 5% to 50% by weight, 10% to 40% by weight, such as 15% to 35% by weight, based on the total weight of the addition polymer. The addition polymer may be derived from a reaction mixture comprising the alkyl esters of (meth)acrylic acid containing from 4 to 18 carbon atoms in the alkyl group in an amount of 2% to 70% by weight, such as 2% to 60% by weight, such as 5% to 50% by weight, 10% to 40% by weight, such as 15% to 35% by weight, based on the total weight of polymerizable monomers used in the reaction mixture.

The addition polymer may comprise constitutional units comprising the residue of a hydroxyalkyl ester. Non-limiting examples of hydroxyalkyl esters include hydroxyethyl (meth)acrylate and hydroxypropyl (meth)acrylate. The constitutional units comprising the residue of the hydroxyalkyl ester may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the hydroxyalkyl ester may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the hydroxyalkyl ester in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture. The inclusion of constitutional units comprising the residue of a hydroxyalkyl ester in the dispersant results in a dispersant comprising at least one hydroxyl group (although hydroxyl groups may be included by other methods). Hydroxyl groups resulting from inclusion of the hydroxyalkyl esters (or incorporated by other means) may react with a separately added crosslinking agent that comprises functional groups reactive with hydroxyl groups such as, for example, an aminoplast, phenolplast, polyepoxides and blocked polyisocyanates, or with N-alkoxymethyl amide groups or blocked isocyanato groups present in the addition polymer when self-crosslinking monomers that have groups that are reactive with the hydroxyl groups are incorporated into the addition polymer.

The addition polymer may comprise constitutional units comprising the residue of an ethylenically unsaturated monomer comprising a heterocyclic group. Non-limiting examples of ethylenically unsaturated monomers comprising a heterocyclic group include epoxy functional ethylenically unsaturated monomers, such as glycidyl (meth)acrylate, vinyl pyrrolidone and vinyl caprolactam, among others. The constitutional units comprising the residue of the ethylenically unsaturated monomers comprising a heterocyclic group may comprise at least 0.5% by weight, such as at least 1% by weight, such as at least 5% by weight, such as at least 8% by weight, and may be no more than 99% by weight, such as no more than 50% by weight, such as no more than 40% by weight, such as no more than 30% by weight, such as no more than 27% by weight, based on the total weight of the addition polymer. The constitutional units comprising the residue of the ethylenically unsaturated monomers comprising a heterocyclic group may comprise 0.5% to 99% by weight, such as 0.5% to 50% by weight, such as 1% to 40% by weight, such as 5% to 30% by weight, 8% to 27% by weight, based on the total weight of the addition polymer. The addition polymer may be derived from a reaction mixture comprising the ethylenically unsaturated monomers comprising a heterocyclic group in an amount of 0.5% to 50% by weight, such as 1% to 40% by weight, such as 5% to 30% by weight, 8% to 27% by weight, based on the total weight of polymerizable monomers used in the reaction mixture.

As noted above, the addition polymer may comprise constitutional units comprising the residue of a self-crosslinking monomer, and the addition polymer may comprise a self-crosslinking addition polymer. As used herein, the term "self-crosslinking monomer" refers to monomers that incorporate functional groups that may react with other functional groups present on the dispersant to a crosslink between the dispersant or more than one dispersant. Non-limiting examples of self-crosslinking monomers include N-alkoxymethyl (meth)acrylamide monomers such as N-butoxymethyl (meth)acrylamide and N-isopropoxymethyl (meth)acrylamide, as well as self-crosslinking monomers containing blocked isocyanate groups, such as isocyanatoethyl (meth)acrylate in which the isocyanato group is reacted ("blocked") with a compound that unblocks at curing temperature. Examples of suitable blocking agents include epsilon-caprolactone and methylethyl ketoxime. The constitutional units comprising the residue of the self-crosslinking monomer may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the self-crosslinking monomer may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the self-crosslinking monomer in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture.

The addition polymer may comprise constitutional units comprising the residue of other alpha, beta-ethylenically unsaturated monomers. Non-limiting examples of other alpha, beta-ethylenically unsaturated monomers include vinyl aromatic compounds such as styrene, alpha-methyl styrene, alpha-chlorostyrene and vinyl toluene; organic nitriles such as acrylonitrile and methacrylonitrile; allyl monomers such as allyl chloride and allyl cyanide; monomeric dienes such as 1,3-butadiene and 2-methyl-1,3-butadiene; and acetoacetoxyalkyl (meth)acrylates such as acetoacetoxyethyl methacrylate (AAEM) (which may be self-crosslinking). The constitutional units comprising the residue of the other alpha, beta-ethylenically unsaturated monomers may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the other alpha, beta-ethylenically unsaturated monomers may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the other alpha, beta-ethylenically unsaturated monomers in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture.

The monomers and relative amounts may be selected such that the resulting addition polymer has a Tg of 100° C. or less, typically from −50° C. to +70° C., such as −50° C. to 0° C. A lower Tg that is below 0° C. may be desirable to ensure acceptable battery performance at low temperature.

The addition polymers may be prepared by conventional free radical initiated solution polymerization techniques in which the polymerizable monomers are dissolved in a solvent or a mixture of solvents and polymerized in the presence of a free radical initiator until conversion is complete. The solvent used to produce the addition polymer may comprise any suitable organic solvent or mixture of solvents.

Examples of free radical initiators are those which are soluble in the mixture of monomers such as azobisisobutyronitrile, azobis(alpha, gamma-methylvaleronitrile), tertiary-butyl perbenzoate, tertiary-butyl peracetate, benzoyl peroxide, ditertiary-butyl peroxide and tertiary amyl peroxy 2-ethylhexyl carbonate.

Optionally, a chain transfer agent which is soluble in the mixture of monomers such as alkyl mercaptans, for example, tertiary-dodecyl mercaptan; ketones such as methyl ethyl ketone, chlorohydrocarbons such as chloroform can be used. A chain transfer agent provides control over the molecular weight to give products having required viscosity for various coating applications.

To prepare the addition polymer, the solvent may be first heated to reflux and the mixture of polymerizable monomers containing the free radical initiator may be added slowly to the refluxing solvent. The reaction mixture is then held at polymerizing temperatures so as to reduce the free monomer content, such as to below 1.0 percent and usually below 0.5 percent, based on the total weight of the mixture of polymerizable monomers.

For use in the electrodepositable coating composition of the invention, the dispersants prepared as described above usually have a weight average molecular weight of about 5,000 to 500,000 g/mol, such as 10,000 to 100,000 g/mol, and 25,000 to 50,000 g/mol.

The dispersant may be present in the electrodepositable coating composition in amount of 2% to 35% by weight, such as 5% to 32% by weight, such as 8% to 30% by weight, such as 15% to 27% by weight, based on the total weight of the binder solids.

The electrodepositable binder may optionally further comprise a non-fluorinated organic film-forming polymer. The non-fluorinated organic film-forming polymer is different than the pH-dependent rheology modifier described herein. The non-fluorinated organic film-forming polymer may comprise polysaccharides, poly(meth)acrylates, polyethylene, polystyrene, polyvinyl alcohol, poly (methyl acrylate), poly (vinyl acetate), polyacrylonitrile, polyimide, polyurethane, polyvinyl butyral, polyvinyl pyrrolidone, styrene butadiene rubber, nitrile rubber, xanthan gum, copolymers thereof, or combinations thereof.

The non-fluorinated organic film-forming polymer may be present, if at all, in an amount of 0% to 90% by weight, such as 10% to 80% by weight, such as 15% to 75% by weight, such as 20% to 60% by weight, such as 25% to 40% by weight, based on the total weight of the binder solids.

The non-fluorinated organic film-forming polymer may be present, if at all, in an amount of at least 0% to 9.9% by weight, such as 0.1% to 5% by weight, such as 0.2% to 2% by weight, such as 0.3% to 0.5% by weight, based on the total solids weight of the electrodepositable coating composition.

The electrodepositable coating composition may also be substantially free, essentially free, or completely free of any or all of the non-fluorinated organic film-forming polymer described herein.

As mentioned above, the binder may optionally further comprise a crosslinking agent. The crosslinking agent should be soluble or dispersible in the aqueous medium and be reactive with active hydrogen groups of at least some of the film-forming polymers of the electrodepositable binder (e.g., the pH-dependent rheology modifier (if the pH-dependent rheology modifier comprises such groups) and/or any other resinous film-forming polymers comprising active hydrogen groups present (if present) in the composition). Non-limiting examples of suitable crosslinking agents include aminoplast resins, blocked polyisocyanates, carbodiimides, and polyepoxides.

Examples of aminoplast resins for use as a crosssslinking agent are those which are formed by reacting a triazine such as melamine or benzoguanamine with formaldehyde. These reaction products contain reactive N-methylol groups. Usually, these reactive groups are etherified with methanol, ethanol, butanol including mixtures thereof to moderate their reactivity. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Blocked polyisocyanate crosslinking agents are typically diisocyanates such as toluene diisocyanate, 1,6-hexamethylene diisocyanate and isophorone diisocyanate including isocyanato dimers and trimers thereof in which the isocyanate groups are reacted ("blocked") with a material such as epsilon-caprolactam and methylethyl ketoxime. At curing temperatures, the blocking agents unblock exposing isocyanate functionality that is reactive with the hydroxyl functionality associated with the (meth)acrylic polymer. Blocked polyisocyanate crosslinking agents are commercially available from Covestro as DESMODUR BL.

Carbodiimide crosslinking agents may be in monomeric or polymeric form, or a mixture thereof. Carbodiimide crosslinking agents refer to compounds having the following structure:

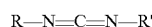

wherein R and R' may each individually comprise an aliphatic, aromatic, alkylaromatic, carboxylic, or heterocyclic group. Examples of commercially available carbodiimide crosslinking agents include, for example, those sold under the trade name CARBODILITE available from Nisshinbo Chemical Inc., such as CARBODILITE V-02-L2, CARBODILITE SV-02, CARBODILITE E-02, CARBODILITE SW-12G, CARBODILITE V-10 and CARBODILITE E-05.

Examples of polyepoxide crosslinking agents are epoxy-containing (meth)acrylic polymers such as those prepared from glycidyl methacrylate copolymerized with other vinyl monomers, polyglycidyl ethers of polyhydric phenols such as the diglycidyl ether of bisphenol A; and cycloaliphatic polyepoxides such as 3,4-epoxycyclohexylmethyl-3,4-epoxycyclohexane carboxylate and bis(3,4-epoxy-6-methylcyclohexyl-methyl) adipate.

The crosslinking agent may be present in the electrodepositable coating composition in amounts of 0% to 30% by weight, such as 5% to 20% by weight, such as 5% to 15% by weight, such as 7% to 12% by weight, the % by weight being based on the total weight of the binder solids.

The crosslinking agent may be present in the electrodepositable coating composition in amounts of 0% to 2% by weight, such as 0.1% to 1% by weight, such as 0.2% to 0.8% by weight, such as 0.3% to 0.5% by weight, the % by weight being based on the total solids weight of the electrodepositable coating composition.

Alternatively, the electrodepositable coating composition may be substantially free, essentially free or completely free of crosslinking agent. The electrodepositable coating composition is substantially free or essentially free of crosslinking agent if crosslinking agent is present, if at all, in an amount of less than 3% or less than 1%, respectively, based on the total weight of the binder solids.

The electrodepositable coating composition may optionally further comprise an adhesion promoter. The adhesion promoter may comprise an acid-functional polyolefin or a thermoplastic material.

The acid-functional polyolefin adhesion promoter may comprise an ethylene-(meth)acrylic acid copolymer, such as an ethylene-acrylic acid copolymer or an ethylene-methacrylic acid copolymer. The ethylene-acrylic acid copolymer may comprise constitutional units comprising 10% to 50% by weight acrylic acid, such as 15% to 30% by weight, such as 17% to 25% by weight, such as about 20% by weight, based on the total weight of the ethylene-acrylic acid copolymer, and 50% to 90% by weight ethylene, such as 70% to 85% by weight, such as 75% to 83% by weight, such as about 80% by weight, based on the total weight of the ethylene-acrylic acid copolymer. A commercially available example of such an addition polymer includes PRIMACOR 5980i, available from the Dow Chemical Company.

The adhesion promoter may be present in the electrodepositable coating composition in an amount of 1% to 80% by weight, 1% to 60% by weight, such as 10% to 40% by weight, such as 25% to 35% by weight, based on the total weight of the binder solids (including the adhesion promoter).

Alternatively, the electrodepositable coating composition may be substantially free, essentially free or completely free of adhesion promoter. The electrodepositable coating composition is substantially free or essentially free of adhesion promoter if adhesion promoter is present, if at all, in an amount of less than 1% or less than 0.1%, respectively, based on the total weight of the binder solids.

The electrodepositable coating composition may optionally comprise a catalyst to catalyze the reaction between the curing agent and the active hydrogen-containing resin(s). Suitable catalysts include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate). The catalyst may also comprise an organic compound such as a guanidine. For example, the guanidine may comprise a cyclic guanidine as described in U.S. Pat. No. 7,842,762 at col. 1, line 53 to col. 4, line 18 and col. 16, line 62 to col. 19, line 8, the cited portions of which being incorporated herein by reference. If present, the catalyst may be present in an amount of 0.01% to 5% by weight, such as 0.1% to 2% by weight, based on the total weight of the binder solids.

Alternatively, the electrodepositable coating composition may be substantially free, essentially free, or completely free of catalyst. The electrodepositable coating composition is substantially free or essentially free of catalyst if catalyst is present, if at all, in an amount of less than 0.01% or less than 0.001%, respectively, based on the total weight of the binder solids.

As used herein, the term "binder solids" may be used synonymously with "resin solids" and includes any film-forming polymer, such as those described above, and, if present, the curing agent. For example, the binder solids include, if present, the pH-dependent rheology modifier, the fluoropolymer, the dispersant, the adhesion promoter, the non-fluorinated organic film-forming polymer, and the separately added crosslinking agent, as described above. The binder solids do not include the electrochemically active material and electrically conductive agent, if present. As used herein, the term "binder dispersion" refers to a dispersion of the binder solids in the aqueous medium.

The electrodepositable binder may comprise, consist essentially of, or consist of the ionic, film-forming resin in an amount of 10% to 100% by weight, such as 50% to 95% by weight, such as 70% to 93% by weight, such as 87% to 92% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the fluoropolymer in an amount of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the fluoropolymer in an amount of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight; the dispersant in an amount of 2% to 35% by weight, such as 5% to 32% by weight, such as 8% to 30% by weight, such as 15% to 27% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the fluoropolymer in an amount of 15% to 99% by weight, such as 30% to 96% by weight, such as 40% to 95% by weight, such as 50% to 90% by weight, such as 70% to 90% by weight, such as 80% to 90% by weight, such as 50% to 80% by weight, such as 50% to 70% by weight, such as 50% to 60% by weight; the dispersant in an amount of 2% to 35% by weight, such as 5% to 32% by weight, such as 8% to 30% by weight, such as 15% to 27% by weight; the adhesion promoter in an amount of 1% to 60% by weight, such as 10% to 40% by weight, such as 25% to 35% by weight; the non-fluorinated organic film-forming polymer, if present, in an amount of 0% to 90% by weight, such as 20% to 90% by weight, such as 20% to 60% by weight, such as 25% to 40% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may comprise, consist essentially of, or consist of the pH-dependent rheology modifier in an amount of 10% to 100% by weight, such as 50% to 95% by weight, such as 70% to 93% by weight, such as 87% to 92% by weight; the adhesion promoter, if present, in an amount of 1% to 60% by weight, such as 10% to 40% by weight, such as 25% to 35% by weight; the non-fluorinated organic film-forming polymer, if present, in an amount of 0% to 90% by weight, such as 20% to 60% by weight, such as 25% to 40% by weight; and the crosslinking agent, if present, in amounts of 0 to 30% by weight, such as 5% to 15% by weight, such as 7% to 13% by weight, the % by weight being based on the total weight of the binder solids.

The electrodepositable binder may be present in the electrodepositable coating composition in amounts of 0.1% to 20% by weight, such as 0.2% to 10% by weight, such as 0.3% to 8% percent by weight, such as 0.5% to 5% by weight, such as 1% to 5% by weight, such as 1% to 3% by weight, such as 1.5% to 2.5% by weight, such as 1% to 2% by weight, based on the total solids weight of the electrodepositable coating composition.

The electrodepositable coating composition of the present invention may optionally further comprise an electrically conductive agent. The electrically conductive agent may be included, for example, when the electrochemically active material comprises a material for use as an active material in a positive electrode. Non-limiting examples of electrically conductive agents include carbonaceous materials such as, activated carbon, carbon black such as acetylene black and furnace black, graphite, graphene, carbon nanotubes, carbon fibers, fullerene, and combinations thereof. It should be noted some of the electrically conductive agents (e.g., graphite) may be used as both an electrochemically active material for negative electrodes as well as an electrically conductive agent, but an electrically conductive material is typically omitted when graphite is used as the electrochemically active material.

In addition to the material described above, the electrically conductive agent may comprise an active carbon having a high-surface area, such as, for example, a BET surface area of greater than 100 $m^2/g$. As used herein, the term "BET surface area" refers to a specific surface area determined by nitrogen adsorption according to the ASTM D 3663-78 standard based on the Brunauer-Emmett-Teller method described in the periodical "The Journal of the American Chemical Society", 60, 309 (1938). In some examples, the conductive carbon can have a BET surface area of 100 $m^2/g$ to 1,000 $m^2/g$, such as 150 $m^2/g$ to 600 $m^2/g$, such as 100 $m^2/g$ to 400 $m^2/g$, such as 200 $m^2/g$ to 400 $m^2/g$. In some examples, the conductive carbon can have a BET surface area of about 200 $m^2/g$. A suitable conductive carbon material is LITX 200 commercially available from Cabot Corporation.

The electrically conductive agent may optionally comprise a protective coating comprising the same coating materials as discussed above with respect to the electrochemically active material comprising a protective coating.

The electrically conductive agent, if present, may be present in the electrodepositable coating composition in amounts of 0.5% to 20% by weight, such as 0.5% to 5% by weight, such as 0.5% to 3% by weight, such as 0.5% to 2% by weight, such as 0.5% to 1% by weight, such as 1% to 20% by weight, such as 2% to 10% by weight, such as 2.5% to 7% by weight, such as 3% to 5% by weight, based on the total solids weight of the electrodepositable coating composition.

Alternatively, the electrodepositable coating composition may be substantially free, essentially free, or free of an electrically conductive agent. As used herein, an electrodepositable coating composition free of the electrically conductive agent is in reference to the electrically conductive agent being used in combination with one of the electrochemically active materials used above. An electrodepositable coating composition is substantially free or essentially free of electrically conductive agent if it is present, if at all, in an amount of less than 0.1% by weight or 0.01% by weight, respectively, based on the total solids weight of the electrodepositable coating composition.

According to the present invention, the electrodepositable coating composition further comprises an aqueous medium comprising water. As used herein, the term "aqueous medium" refers to a liquid medium comprising more than 50% by weight water, based on the total weight of the aqueous medium. Such aqueous mediums may comprise less than 50% by weight organic solvent, or less than 40% by weight organic solvent, or less than 30% by weight organic solvent, or less than 20% by weight organic solvent, or less than 10% by weight organic solvent, or less than 5% by weight organic solvent, or less than 1% by weight organic solvent, less than 0.8% by weight organic solvent, or less than 0.1% by weight organic solvent, based on the total weight of the aqueous medium. Water comprises more than 50% by weight of the aqueous medium, such as at least 60% by weight, such as at least 70% by weight, such as at least 80% by weight, such as at least 85% by weight, such as at least 90% by weight, such as at least 95% by weight, such as at least 99% by weight, such as at least 99.9% by weight, such as 100% by weight, based on the total weight of the aqueous medium. Water may comprise 50.1% to 100% by weight, such as 70% to 100% by weight, such as 80% to 100% by weight, such as 85% to 100% by weight, such as 90% to 100% by weight, such as 95% to 100% by weight, such as 99% to 100% by weight, such as 99.9% to 100% by weight, based on the total weight of the aqueous medium. The aqueous medium may further comprise one or more organic solvent(s). Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. The electrodepositable coating composition may be provided in the form of a dispersion, such as an aqueous dispersion.

Water is present in the aqueous medium such that the total amount of water present in the electrodepositable coating composition is at least 40% by weight, such as at least 45% by weight, such as at least 50% by weight, such as at least 55% by weight, such as at least 60% by weight, such as at least 65% by weight, such as at least 70% by weight, such as at least 75% by weight, such as at least 80% by weight, such as at least 85% by weight, such as at least 90% by weight, such as at least 95% by weight, based on the total weight of the electrodepositable coating composition. Water may be present in the aqueous medium such that the total amount of water present in the electrodepositable coating composition is 40% to 99% by weight, such as 45% to 99% by weight, such as 50% to 99% by weight, such as 60% to 99% by weight, such as 65% to 99% by weight, such as 70% to 99% by weight, such as 75% to 99% by weight, such as 80% to 99% by weight, such as 85% to 99% by weight, such as 90% to 99% by weight, such as 40% to 90% by weight, such as 45% to 85% by weight, such as 50% to 80% by weight, such as 60% to 75% by weight, based on the total weight of the electrodepositable coating composition.

The total solids content of the electrodepositable coating composition may be 0.1% to 60% by weight, such as 0.1% to 50% by weight, such as 0.1% to 40% by weight, such as 0.1% to 30% by weight, such as 0.1% to 25% by weight, such as 0.1% to 20% by weight, such as 0.1% to 15% by weight, such as 0.1% to 12% by weight, such as 0.1% to 10% by weight, such as 0.1% to 7% by weight, such as 0.1% to 5% by weight, such as 0.1% to 1% by weight, such as 1% to 60% by weight, such as 1% to 50% by weight, such as 1% to 40% by weight, such as 1% to 30% by weight, such as 1% to 25% by weight, such as 1% to 20% by weight, such as 1% to 15% by weight, such as 1% to 12% by weight, such as 1% to 10% by weight, such as 1% to 7% by weight, such as 1% to 5% by weight based on the total weight of the electrodepositable coating composition.

The electrodepositable coating composition and any resulting electrodeposited coating layer derived therefrom may comprise, consist essentially of, or consist of the electrochemically active material in an amount of 45% to 99% by weight, such as 70% to 99% by weight, such as 80% to 99% by weight, such as 90% to 99% by weight, such as 91% to 99% by weight, such as 91% to 99% by weight, such as 94% to 99% by weight, such as 95% to 99% by weight, such as 96% to 99% by weight, such as 97% to 99% by weight; the electrodepositable binder in an amount of 0.1% to 20% by weight, such as 0.2% to 10% by weight, such as 0.3% to 8% percent by weight, such as 0.5% to 5% by weight, such as 1% to 3% by weight, such as 1.5% to 2.5% by weight, such as 1% to 2% by weight, based on the total solids weight of the electrodepositable coating composition; and optionally the electrically conductive agent in an amount of 0.5% to 20% by weight, such as 1% to 20% by weight, such as 2% to 10% by weight, such as 2.5% to 7% by weight, such as 3% to 5% by weight, based on the total solids weight of the electrodepositable coating composition.

The pH of the electrodepositable coating composition will depend upon the type of electrodeposition in which the composition is to be used, as well as additives, such as pigments, fillers, and the like, included in the electrodepositable coating composition. The selection of electrochemically active material may significantly impact the pH of the electrodepositable coating composition. For example, an anionic electrodepositable coating composition may have a pH from about 6 to about 12, such as about 6.5 to about 11, such as about 7 to about 10.5. In contrast, a cationic electrodepositable coating composition may have a pH from about 4.5 to about 10, such as about 4.5 to about 5.5, about 5.5 to about 8, such as about 8 to about 9.5.

The electrodepositable coating composition may optionally further comprise a pH adjustment agent. The pH adjustment agent may comprise an acid or base. The acid may comprise, for example, phosphoric acid or carbonic acid. The base may comprise, for example, lithium hydroxide, lithium carbonate, or dimethylethanolamine (DMEA). Any suitable amount of pH adjustment agent needed to adjust the pH of the electrodepositable coating composition to the desired pH range may be used.

The electrodepositable coating composition may be substantially free, essentially free, or completely free of N-methyl-2-pyrrolidone (NMP). The electrodepositable coating composition may also be substantially free, essentially free, or completely free of further fugitive adhesion promoter. As used herein, the term "fugitive adhesion promoter" refers to N-methyl-2-pyrrolidone (NMP), dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea. As used herein, an electrodepositable coating composition substantially free of fugitive adhesion promoter if it includes less than 1% by weight fugitive adhesion promoter, if any at all, based on the total weight of the electrodepositable coating composition. As used herein, an electrodepositable coating composition essentially free of fugitive adhesion promoter if it includes less than 0.1% by weight fugitive adhesion promoter, if any at all, based on the total weight of the electrodepositable coating composition. When present, the fugitive adhesion promoter may be present in an amount of less than 2% by weight, such as less 1% by weight, such as less than 0.9% by weight, such as less than 0.1% by weight, such as less than 0.01% by weight, such as less than 0.001% by weight, based on the total weight of the electrodepositable coating composition.

According to the present invention, the electrodepositable coating composition may be substantially free, essentially free or completely free of fluoropolymer.

The electrodepositable coating composition may be substantially free, essentially free, or completely free of organic carbonate. As used herein, an electrodepositable composition is substantially free or essentially free of organic carbonate when organic carbonate is present, if at all, in an amount less than 1% by weight or less than 0.1% by weight, respectively, based on the total weight of the electrodepositable coating composition.

The electrodepositable coating composition may be substantially free, essentially free, or completely free of acrylic-modified fluoropolymer. As used herein, an electrodepositable composition is substantially free or essentially free of acrylic-modified fluoropolymer when acrylic-modified fluoropolymer is present, if at all, in an amount less than 1% by weight or less than 0.1% by weight, respectively, based on the total binder solids weight of the electrodepositable coating composition.

According to the present invention, the electrodepositable coating composition may be substantially free, essentially free or completely free of any or all of polyethylene, polytetrafluoroethylene, tetrafluoroethylene-hexafluoropropylene copolymer, and/or polyacrylonitrile derivatives.

The electrodepositable coating composition may be substantially free, essentially free, or completely free of acrylonitrile. As used herein, an electrodepositable composition is substantially free or essentially free of acrylonitrile when acrylonitrile is present, if at all, in an amount less than 1% by weight or less than 0.1% by weight, respectively, based on the total binder solids weight of the electrodepositable coating composition.

The electrodepositable coating composition may be substantially free, essentially free, or completely free of graphene oxide. As used herein, an electrodepositable composition is substantially free or essentially free of graphene oxide when graphene oxide is present, if at all, in an amount less than 5% by weight or less than 1% by weight, respectively, based on the total weight of the electrodepositable coating composition.

The pH-dependent rheology modifier may be substantially free, essentially free, or completely free of the residue of a carboxylic acid amide monomer unit. As used herein, a pH-dependent rheology modifier is substantially free or essentially free of carboxylic acid amide monomer units when carboxylic acid amide monomer units are present, if at all, in an amount less than 0.1% by weight or less than 0.01% by weight, respectively, based on the total weight of the pH-dependent rheology modifier.

The electrodepositable coating may be substantially free, essentially free, or completely free of isophorone.

The electrodepositable coating may be substantially free, essentially free, or completely free of cellulose and cellulose derivatives. Non-limiting examples of cellulose derivatives includes carboxymethylcellulose and salts thereof (CMC). As used herein, an electrodepositable composition is substantially free or essentially free of cellulose and cellulose derivatives when cellulose and cellulose derivatives is present, if at all, in an amount less than 5% by weight or less than 1% by weight, respectively, based on the total binder solids weight of the electrodepositable coating composition.

The electrodepositable coating may be substantially free, essentially free, or completely free of multi-functional hydrazide compounds. As used herein, an electrodepositable composition is substantially free or essentially free of multi-functional hydrazide compounds when multi-functional hydrazide compounds are present, if at all, in an amount less than 0.1% by weight or less than 0.01% by weight, respectively, based on the total binder solids weight of the electrodepositable coating composition.

The electrodepositable coating may be substantially free, essentially free, or completely free of styrene-butadiene rubber (SBR), acrylonitrile butadiene rubber or acrylic rubber. As used herein, an electrodepositable composition is substantially free or essentially free of styrene-butadiene rubber (SBR), acrylonitrile butadiene rubber or acrylic rubber when styrene-butadiene rubber (SBR), acrylonitrile butadiene rubber or acrylic rubber is present, if at all, in an amount less than 5% by weight or less than 1% by weight, respectively, based on the total binder solids weight of the electrodepositable coating composition.

The electrodepositable coating may be substantially free, essentially free, or completely free of poly(meth)acrylic acid having more than 70% by weight (meth)acrylic acid functional monomers, based on the total weight of the poly (meth)acrylic acid. As used herein, an electrodepositable composition is substantially free or essentially free of the poly(meth)acrylic acid when the poly(meth)acrylic acid is present, if at all, in an amount less than 5% by weight or less than 1% by weight, respectively, based on the total binder solids weight of the electrodepositable coating composition.

The electrodepositable coating composition may be substantially free, essentially free, or completely free of particulate polymers containing the residue of an aliphatic conjugated diene monomer unit and an aromatic vinyl monomer unit. As used herein, an electrodepositable composition is substantially free or essentially free of such particulate polymers when the particulate polymer is present, if at all, in an amount less than 5% by weight or less than 1% by weight, respectively, based on the total weight of the binder solids.

For example, the thickness of the coating formed after electrodeposition may be at least 0.5 micron, such as 1 to 1,000 microns (μm), such as 5 to 750 microns such as 10 to 500 μm, such as 20 to 400 microns such as 25 to 300 microns, such as 50 to 250 μm, such as 75 to 200 μm, such as 100 to 150 microns.

The method of the present invention further comprises rinsing the coated electrical current collector, wherein the electrodeposited coating layer substantially adheres to the treated portion of the surface and does not adhere to the non-treated portion of the surface.

The rinse may be any solvent that does not dissolve the electrodepositable binder of the electrodepositable coating composition. The rinse may be applied to the surface of the surface of the electrical current collector by any method known in the art. For example, the rinse may be water or any of the co-solvents used in the electrodepositable coating composition such that the rinse can be performed directly over the bath with the water and/or co-solvent rinsing directly into the bath. The water and/or co-solvent would also carry components of the electrodepositable coating composition back into the bath. For example, the rinse may be a water rinse and the water may be cascaded over the surface of the electrical current collector as the electrical current collector leaves the bath. The rinse may be applied by spraying the electrical current collector surface after it leaves the bath. The amount of water rinse and pressure of the rinse is not limited so long as the rinse is capable of removing the electrodeposited coating layer from the non-treated portions of the surface without damaging the electrodeposited coating layer adhering to the treated portions of the surface. Accordingly, the non-treated portion of the surface of the electrical current collector may be substantially free, essentially free, or completely free of the electrodeposited coating layer after rinsing. As used herein, the surface is substantially free of the electrodeposited coating layer if it is present in an amount of less than 5% by weight of the average coating weight of the surface including the treatment layer. As used herein, the surface is essentially free of the electrodeposited coating layer if it is present in an amount of less than 3% by weight of the average coating weight of the surface including the treatment layer.

Figure 1B:
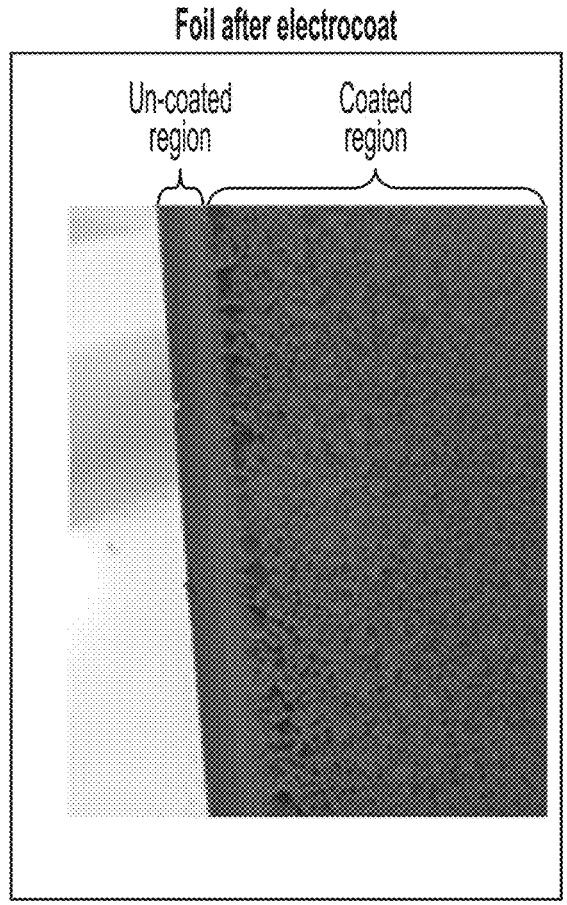
FIG. 1b is a photograph of the same electrical current collector after electrodeposition and water rinse.

Without intending to be bound by any theory, it is believed that the adhesion promoting composition that produces that treatment layer over a portion of the surface improves the wet adhesion of the electrodeposited coating layer to the electrical current collector. The resulting differential adhesion between the treated and non-treated portions of the surface allows for controlled pattern coating of the electrical current collector without the need for masking agents or other methods to prevent the coating layer from depositing over the entire surface of the electrical current collector by relatively easily removing the electrodeposited coating layer from the non-treated portions of the surface of the electrical current collector with a water rinse. For example, as shown in FIG. 1a, an exemplary carbon-coated aluminum foil may have a non-treated portion (bare aluminum) and a region with a carbon-based coating. If the entire foil is submerged into an electrodepositable coating composition and electrocoated followed by a rinse step, only the pre-treated portion of the foil retains the electrodepositable coating layer, as shown in FIG. 1b.

The resulting edge of the electrodepositable coating layer may be more defined than edges applied by other methods of coating the electrical current collector. For example, the edge may be sharper and have less slope than a similar coating composition applied by a drawdown method typically used for applying such coatings. It is believed that the drawdown process causes a flow of the slurry material and a longer edge compared to the self-leveling edge from electrodeposition according to the present invention. This effect may be demonstrated by analyzing the slope of the edge of the electrodeposited coating layer in comparison to a comparative coating composition. For example, the edge of the treatment layer and electrodeposited coating layer stack applied according to the method described herein may be compared to a comparative composition applied by a drawdown method. After application of the coatings, a cross sectional FE-SEM can be used for taking micrograph images of the edges of the coating layers. For example, square sections may be cut from each sample with a surgical prep blade and placed on aluminum stubs with carbon tape. The samples may then be coated with Au/Pd for 60 seconds and analyzed in a Quanta 250 FEG SEM under high vacuum. The accelerating voltage may be set to 20.00 kV and the spot size may be 3.0. The micrograph image of the edge of the coating on the electrical current collector may be used to reveal the geometry of the edge. The captured image may then be measured from the point where the coating film begins to slope to where coating film stops. The length of the slope may be compared to the thickness of the coating film (e.g., the total thickness of the treatment layer and electrodeposited layer stack) applied over the electrical current collector, and these measurements may be used to compare the ratio of the length of the slope to the thickness of the coating layer as well as the angle of the slope measured from the surface of the electrical current collector. This method of analysis is referred to herein as the "EDGE ANGLE MEASUREMENT TEST METHOD." For clarity, any reference to an edge measurement of the coating is made in reference to an edge that is adjacent to a portion of bare electrical current collector and not an edge that extends to the edge of the electrical current collector itself.

According to the present invention, the treatment layer and electrodeposited coating layer may form a sloped edge having an angle measured from the surface of the electrical current collector of at least 35°, as measured by the EDGE ANGLE MEASUREMENT TEST METHOD, such as at least 40°, such as at least 42°, such as at least 44°, such as at least 50°, such as at least 55°, such as at least 60°, such as at least 65°, such as at least 70°, such as at least 75°.

According to the present invention, the treatment layer and electrodeposited coating layer may form a sloped edge having an angle measured from the surface of the electrical current collector at least 5° steeper than a comparative composition applied by a method other than electrodeposition, such as at least 8° steeper, such as at least 10° steeper, such as at least 12° steeper, such as at least 20° steeper, such as at least 30° steeper, such as at least 40° steeper, such as at least 50° steeper. As used herein, a "comparative composition" refers to a composition having the same electrochemically active material, a substantially similar binder, and other similar optional components (e.g., dispersant, electrically conductive material, etc.) in the same solids concentration as the electrodepositable coating composition it is being compared to. For clarity, the comparative composition may have a different solvent system and overall solids concentration from the electrodepositable coating composition.

According to the present invention, the edge of the treatment layer and electrodeposited coating layer may be sloped and the ratio of the length of the slope to the thickness of the treatment layer and electrodeposited coating layer may be at least 0.5:1, as measured by the EDGE ANGLE MEASUREMENT TEST METHOD, such as at least 0.6:1, such as at least 0.7:1, such as at least 0.8:1, such as at least 0.9:1. The edge of the treatment layer and electrodeposited coating layer may be sloped and the ratio of the length of the slope to the thickness of the treatment layer and electrodeposited coating layer may be no more than 2.4:1, such as no more than 1.5:1, as measured by the EDGE ANGLE MEASUREMENT TEST METHOD, such as no more than 1.4:1, such as no more than 1.3:1, such as no more than 1.1:1, such as no more than 1:1, such as no more than 0.9:1. The edge of the treatment layer and electrodeposited coating layer may be sloped and the ratio of the length of the slope to the thickness of the treatment layer and electrodeposited coating layer may be 0.5:1 to 2.4:1, as measured by the EDGE ANGLE MEASUREMENT TEST METHOD, such as 0.6:1 to 1.5:1, 0.7:1 to 1.4:1, such as 0.7:1, to 1:1, such as 0.7:1 to 0.9:1, such as 0.8:1 to 1.3:1, such as 0.9:1 to 1.1:1.

According to the present invention, the edge of the treatment layer and electrodeposited coating layer comprising lithium iron phosphate (LFP) may have a ratio of the length of the slope to the thickness of the treatment layer and electrodeposited coating layer may be 0.5:1 to 2.4:1, as measured by the EDGE ANGLE MEASUREMENT TEST METHOD, such as 0.6:1 to 1.5:1, such as 0.7:1, to 1:1, such as 0.7:1 to 0.9:1.

According to the present invention, the edge of the treatment layer and electrodeposited coating layer comprising nickel manganese cobalt (NMC) may have a ratio of the length of the slope to the thickness of the treatment layer and electrodeposited coating layer of 0.7:1 to 1.4:1, as measured by the EDGE ANGLE MEASUREMENT TEST METHOD, such as 0.8:1 to 1.3:1, such as 0.9:1 to 1.1:1.

The method of the present invention may optionally further comprise drying and/or curing the electrodepositable coating layer. For example, the electrical current collector may be baked in an oven to dry and/or crosslink the electrodepositable coating layer. For example, the coated electrical current collector may be baked at temperatures of 400° C. or lower, such as 300° C. or lower, such as 275° C. or lower, such as 255° C. or lower, such as 225° C. or lower, such as 200° C. or lower, such as at least 50° C., such as at least 60° C., such as 50-400° C., such as 100-300° C., such as 150-280° C., such as 200-275° C., such as 225-270° C., such as 235-265° C., such as 240-260° C. The time of heating will depend somewhat on the temperature. Generally, higher temperatures require less time for curing. Typically, curing times are for at least 5 minutes, such as 5 to 60 minutes. The temperature and time should be sufficient such that the electrodepositable binder in the cured film is cross-linked (if applicable), that is, covalent bonds are formed between co-reactive groups on the film-forming polymer and the crosslinking agent. In other cases, after electrocoating and rinsing of the electrical current collector, the electrical current collector may simply be allowed to dry under ambient conditions. As used herein, "ambient conditions" refers to atmospheric air having a relative humidity of 10 to 100 percent and a temperature in the range of −10 to 120° C., such as 5 to 80° C., such as 10 to 60° C. and, such as 15 to 40° C. Other methods of drying the coating film include microwave drying and infrared drying, and other methods of curing the coating film include e-beam curing and UV curing.

The electrodeposited coating layer of the electrode may comprise a cross-linked coating. As used herein, the term "cross-linked coating" refers to a coating wherein functional groups of the component molecules of the electrodepositable binder have reacted to form covalent bonds that cross-link component molecules of the binder. The cross-linked coating may be a thermoset coating. For example, as described herein, the electrodepositable binder may comprise a film-forming polymer and a curing agent, and the functional groups of the film-forming polymer may be reactive with the functional groups of the curing agent such that the functional groups react and form covalent bonds during the curing of the electrodeposited coating layer. Other components of the electrodepositable binder described below may also have functional groups reactive with functional groups of the crosslinking agent and/or film-forming polymer and may also serve to cross-link the coating. In addition, the electrodeposited coating layer is also a solid coating whether it is cross-linked or not.

The present invention is also directed to an electrode. The electrode comprises an electrical current collector having a surface, a treatment layer on a portion of the surface of the electrical current collector, wherein (a) a portion of the surface of the electrical current collector comprises the treatment layer and (b) a portion of the surface of the electrical current collector lacks the treatment layer, and an electrodeposited coating layer that is present over the treatment layer and is not present over the portion of the surface of the electrical current collector lacks the treatment layer. The electrode may comprise a positive electrode or a negative electrode.

The electrical current collector may comprise any of the materials described above. For example, the electrical current collector may comprise aluminum, copper, steel, stainless steel, nickel, or combinations thereof.

The electrode may be made using the method of coating an electrical current collector described herein. Accordingly, the treatment layer and electrodeposited coating layer of the electrode may comprise the treatment layer and electrodeposited coating layer described above.

The present invention is also directed to an electrical storage device. An electrical storage device according to the present invention may be manufactured by using one or more of the above electrodes of the present invention. The electrical storage device comprises an electrode of the present invention, a counter electrode and an electrolyte. The counter-electrode optionally may also comprise an electrode of the present invention, as long as one electrode is a positive electrode and one electrode is a negative electrode. Electrical storage devices according to the present invention include, for example, a cell, a battery, a battery pack, a secondary battery, a capacitor, a pseudocapacitor, and a supercapacitor.

The electrical storage device includes an electrolytic solution and can be manufactured by using parts such as a separator in accordance with a commonly used method. As a more specific manufacturing method, a negative electrode and a positive electrode are assembled together with a separator there between, the resulting assembly is rolled or bent in accordance with the shape of a battery and put into a battery container, an electrolytic solution is injected into the battery container, and the battery container is sealed up. The shape of the battery may be like a coin, button or sheet, cylindrical, square or flat.

The electrolytic solution may be liquid or gel, and an electrolytic solution which can serve effectively as a battery may be selected from among known electrolytic solutions which are used in electrical storage devices in accordance with the types of a negative electrode active material and a positive electrode active material. The electrolytic solution may be a solution containing an electrolyte dissolved in a suitable solvent. The electrolyte may be conventionally known lithium salt for lithium ion secondary batteries. Examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiB(C_6H_5)_4$, $LiCF_3SO_3$, $LiCH_3SO_3$, $LiC_4F_9SO_3$, $Li(CF_3SO_2)_2N$, $LiB_4CH_3SO_3Li$ and $CF_3SO_3Li$. The solvent for dissolving the above electrolyte is not particularly limited and examples thereof include carbonate compounds such as propylene carbonate, ethylene carbonate, butylene carbonate, dimethyl carbonate, methyl ethyl carbonate and diethyl carbonate; lactone compounds such as γ-butyl lactone; ether compounds such as trimethoxymethane, 1,2-dimethoxyethane, diethyl ether, 2-ethoxyethane, tetrahydrofuran and 2-methyltetrahydrofuran; and sulfoxide compounds such as dimethyl sulfoxide. The concentration of the electrolyte in the electrolytic solution may be 0.5 to 3.0 mole/L, such as 0.7 to 2.0 mole/L.

During discharge of a lithium ion electrical storage device, lithium ions may be released from the negative electrode and carry the current to the positive electrode. This process may include the process known as deintercalation. During charging, the lithium ions migrate from the electrochemically active material in the positive electrode to the negative electrode where they become embedded in the electrochemically active material present in the negative electrode. This process may include the process known as intercalation.

As used herein, the term "polymer" refers broadly to oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, 2-ethylacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

As used herein molecular weights are determined by gel permeation chromatography using a polystyrene standard. Unless otherwise indicated molecular weights are on a weight average basis.

The term "glass transition temperature" is a theoretical value being the glass transition temperature as calculated by the method of Fox on the basis of monomer composition of the monomer charge according to T. G. Fox, Bull. Am. Phys. Soc. (Ser. II) 1, 123 (1956) and J. Brandrup, E. H. Immergut, Polymer Handbook $3^{rd}$ edition, John Wiley, New York, 1989.

As used herein, unless otherwise defined, the term substantially free means that the component is present, if at all, in an amount of less than 5% by weight, based on the total weight of the electrodepositable coating composition.

As used herein, unless otherwise defined, the term essentially free means that the component is present, if at all, in an amount of less than 1% by weight, based on the total weight of the electrodepositable coating composition.

As used herein, unless otherwise defined, the term completely free means that the component is not present in the electrodepositable coating composition, i.e., 0.00% by weight, based on the total weight of the electrodepositable coating composition.

As used herein, the term "total solids" refers to the non-volatile components of the electrodepositable coating composition of the present invention and specifically excludes the aqueous medium. The total solids explicitly include at least the binder solids, electrochemically active material, and, if present, the electrically conductive agent.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" fluoropolymer, "an" electrochemically active material, and "a" modifier with pH-dependent rheology, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

In view of the foregoing, the present invention thus relates, without being limited thereto, to the following aspects:

Aspect 1. A method of coating an electrical current collector comprising treating a portion of a surface of the electrical current collector with an adhesion promoting composition to deposit a treatment layer over the portion of the surface of the electrical current collector, wherein the resulting surface of the electrical current collector comprises (a) a treated portion comprising the treatment layer and (b) a non-treated portion that lacks the treatment layer; electrodepositing an electrodeposited coating layer from an electrodepositable coating composition onto the surface of the electrical current collector to form a coated electrical current collector; and rinsing the coated electrical current collector, wherein the electrodeposited coating layer substantially adheres to the treated portion of the surface and does not adhere to the non-treated portion of the surface.

Aspect 2. The method of Aspect 1, wherein the electrical current collector comprises aluminum, copper, steel, stainless steel, nickel, or combinations thereof.

Aspect 3. The method of Aspect 1 or 2, wherein the adhesion promoting composition comprises a conductive primer coating composition, and the treatment layer comprises a conductive primer coating layer.

Aspect 4. The method of Aspect 3, wherein the conductive primer coating composition comprises a carbon-based conductive primer coating composition, and the conductive primer coating layer comprises a carbon-based conductive primer coating layer.

Aspect 5. The method of Aspect 1 or 2, wherein the adhesion promoting composition comprises a pretreatment composition, and the treatment layer comprises a pretreatment layer.

Aspect 6. The method of any of the preceding Aspects, wherein electrodepositing the electrodeposited coating layer comprises at least partially immersing the electrical current collector into a bath comprising the electrodepositable coating composition; and electrodepositing a coating deposited from the electrodepositable coating onto at least a portion of the surface of the electrical current collector immersed in the bath.

Aspect 7. The method of any of the preceding Aspects, wherein the electrodepositable coating composition comprises an electrochemically active material and an electrodepositable binder comprising a pH-dependent rheology modifier, and the electrodeposited coating layer comprises the electrochemically active material and the electrodepositable binder.

Aspect 8. The method of Aspect 7, wherein the electrodepositable binder further comprises a fluoropolymer, a non-fluorinated organic film-forming polymer, a dispersant, or combinations thereof.

Aspect 9. The method of Aspect 7 or 8, wherein the electrodepositable binder further comprises a crosslinking agent.

Aspect 10. The method of any of the preceding Aspects 7-9, wherein the electrochemically active material comprises $LiCoO_2$, $LiNiO_2$, $LiFePO_4$, $LiFeCoPO_4$, $LiCoPO_4$, $LiMnO_2$, $LiMn_2O_4$, $Li(NiMnCo)O_2$, $Li(NiCoAl)O_2$, carbon-coated $LiFePO_4$, sulfur, sulfur compounds, $LiO_2$, $FeF_2$ and $FeF_3$, aluminum, SnCo, $Fe_3O_4$, or any combination thereof.

Aspect 11. The method of any of the preceding Aspects 7-9, wherein the electrochemically active material comprises graphite, lithium titanate, lithium vanadium phosphate, silicon, silicon compounds, tin, tin compounds, lithium metal, graphene, or a combination thereof.

Aspect 12. The method of any of the preceding Aspects 7-11, wherein the electrodepositable coating composition further comprises an electrically conductive agent.

Aspect 13. An electrode comprising an electrical current collector having a surface; a treatment layer on a portion of the surface of the electrical current collector, wherein (a) a portion of the surface of the electrical current collector comprises the treatment layer and (b) a portion of the surface of the electrical current collector lacks the treatment layer; and an electrodeposited coating layer that is present over the treatment layer and is not present over the portion of the surface of the electrical current collector lacks the treatment layer.

Aspect 14. The electrode of Aspect 13, wherein the electrode is coated by any of the methods of the preceding Aspects 1-12.

Aspect 15. The electrode of Aspect 13 or 14, wherein the non-treated portion of the surface of the electrical current collector is substantially free of the electrodeposited coating layer.

Aspect 16. The electrode of any of preceding Aspects 13-15, wherein the combined thickness of the treatment layer and electrodeposited coating layer is from 0.5 microns to 1,000 microns.

Aspect 17. The electrode of any of preceding Aspects 13-16, wherein the treatment layer and electrodeposited coating layer form a sloped edge having an angle measured from the surface of the electrical current collector of at least 35°, as measured by the EDGE ANGLE MEASUREMENT TEST METHOD.

Aspect 18. The electrode of any of preceding Aspects 13-17, wherein an edge of the treatment layer and electrodeposited coating layer is sloped and the ratio of the length of the slope to the thickness of the treatment layer and electrodeposited coating layer of the slope is at least 0.5:1, as measured by the EDGE ANGLE MEASUREMENT TEST METHOD.

Aspect 19. The electrode of any of preceding Aspects 13-18, wherein the electrodeposited coating layer comprises LFP and an edge of the treatment layer and electrodeposited coating layer is sloped and the ratio of the length of the slope to the thickness of the treatment layer and electrodeposited coating layer of the slope is from 0.5:1 to 2.4:1, as measured by the EDGE ANGLE MEASUREMENT TEST METHOD.

Aspect 20. The electrode of any of preceding Aspects 13-18, wherein the electrodeposited coating layer comprises NMC and an edge of the electrodeposited coating layer is sloped and the ratio of the length of the slope to the thickness of the treatment layer and electrodeposited coating layer of the slope is from 0.7:1 to 1.4:1, as measured by the EDGE ANGLE MEASUREMENT TEST METHOD.

Aspect 21. The electrode of any of preceding Aspects 13-20, wherein the electrical current collector comprises aluminum, copper, steel, stainless steel, nickel, or combinations thereof.

Aspect 22. The electrode of any of preceding Aspects 13-21, wherein the electrodeposited coating layer comprises an electrochemically active material and an electrodepositable binder comprising a pH-dependent rheology modifier.

Aspect 23. The electrode of Aspect 22, wherein the electrodepositable binder further comprises a fluoropolymer, a non-fluorinated organic film-forming polymer, a dispersant, or combinations thereof.

Aspect 24. The electrode of Aspect 22 or 23, wherein the electrodepositable binder further comprises a crosslinking agent.

Aspect 25. The electrode of any of preceding Aspects 22-24, wherein the electrodeposited coating layer further comprises an electrically conductive agent.

Aspect 26. The electrode of any of preceding Aspects 13-25, wherein the electrodeposited coating layer is crosslinked.

Aspect 27. The electrode of any of preceding Aspects 13-26, wherein the electrode comprises a positive electrode.

Aspect 28. The electrode of any of preceding Aspects 13-27, wherein the electrochemically active material comprises $LiCoO_2$, $LiNiO_2$, $LiFePO_4$, $LiFeCoPO_4$, $LiCoPO_4$, $LiMnO_2$, $LiMn_2O_4$, $Li(NiMnCo)O_2$, $Li(NiCoAl)O_2$, carbon-coated $LiFePO_4$, sulfur, sulfur compounds, $LiO_2$, $FeF_2$ and $FeF_3$, aluminum, SnCo, $Fe_3O_4$, or any combination thereof.

Aspect 29. The electrode of any of preceding Aspects 13-26, wherein the electrode comprises a negative electrode.

Aspect 30. The electrode of any of preceding Aspects 13-18, 21-26, wherein the electrochemically active material comprises graphite, lithium titanate, lithium vanadium phosphate, silicon, silicon compounds, tin, tin compounds, lithium metal, graphene, or any combination thereof.

Aspect 31. An electrical storage device comprising (a) the electrode of any of preceding Aspects 13-30; (b) a counter-electrode; and (c) an electrolyte.

Aspect 32. The electrical storage device of Aspect 31, wherein the electrical storage device comprises a cell, a battery pack, a secondary battery, a capacitor, a supercapacitor, or any combination thereof.

Illustrating the invention are the following examples, which, however, are not to be considered as limiting the invention to their details. Unless otherwise indicated, all parts and percentages in the following examples, as well as throughout the specification, are by weight.

EXAMPLES

Example A

Preparation of an Electrodepositable Coating Composition

To a plastic cup was added 12.60 g of a pH-dependent rheology modifier (ACRYSOL HASE TT-615 from DOW Chemical, 3.75 g of solid material, 4.50 wt. % of total solids), 65.87 g of water, and 1.042 g of a crosslinking agent (CARBODILITE V-02-L2, available from Nisshinbo Chemical Inc., 0.42 g solid material, 0.50 wt. % of total solids). This mixture was mixed in a centrifugal mixer at 2000 RPMs for 5 minutes. Next, 75.0 g (90 wt. % of total solids) of Lithium Iron Phosphate positive electrode electrochemically active material acquired from Gelon was added to the mixture and mixed in centrifugal mixer at 2000 RPMs for 5 minutes. Next, 4.17 g (5.0 wt. %) of carbon black (SUPER P, from available from Imerys) was added to the mixture and mixed in a centrifugal mixer at 2000 RPMs for 5 minutes. Finally, 9.0 g of Hexyl CELLOSOLVE glycol ether from DOW Chemical was added to the slurry and mixed in a centrifugal mixer at 2000 RPMs for 5 minutes. The slurry was diluted to 10% total solids by the addition of 634.0 g of water under constant stirring. The electrodepositable coating composition was stirred for 30 minutes prior to be electrodeposited onto any electrical current collectors.

Comparative Example 1

In this example, the electrodepositable coating composition from Example A was electrodeposited onto a bare aluminum foil according to the following method: A 7.5 cm×8 cm bare aluminum foil (acquired from MTI) was immersed 8 cm into the electrodepositable coating composition with a separation of 2.7 cm from a 9 cm×10 cm aluminum foil counter electrode immersed 3 cm into the electrodepositable coating composition. Constant stirring was maintained during the electrodeposition process and an application of 100V was applied for a period of 30 seconds. The coated foil was removed from solution and left to dry without any post-treatment. Depositions after 30 s applied voltage yielded a coating mass deposition of 8.46 mg/cm$^2$.

Comparative Example 2

In this example, the same electrodepositable coating composition and procedure as used in Example 1 was used with the exception that the coated foil was subjected to a rinse treatment after the film was electrodeposited. To perform the rinse, a plastic cup filled with 200 g of water was cascaded from a height of 5 cm from the foil surface onto the aluminum foil in a vertically aligned position, and then the foil was left to dry. Depositions after 30 s of applied voltage and subsequent post-rinse yielded a mass deposition of 1.24 mg/cm$^2$.

Comparative Example 3

In this example, the same electrodepositable coating composition and procedure as used in Example 1 was used with the exception that the foil to be coated was replaced with a 7.5 cm×8 cm aluminum foil having a non-treated portion of the surface (i.e., bare aluminum) and a treated portion having a carbon-based conductive primer coating (available from ARMOR as En' Safe® Primed Aluminum Roll). The non-treated portion of the aluminum foil had a thickness of about 20 microns and a width of 1.5 cm that ran along the edge for the entire length of the 8 cm aluminum foil (approx. surface area of 12 cm$^2$), and the carbon-based primer covered the remainder of the surface with a coating approximately 2-4 microns thick (approx. surface area of 48 cm$^2$). The coated foil was not subjected to a post-rinse after electrodeposition. Depositions after 30 s applied voltage yielded a mass deposition of 30.97 mg/cm$^2$.

Example 4

In this example, the same electrodepositable coating composition and procedure as used in Example 3 was used with the exception that the coated foil was subjected to the same rinse treatment as described in Example 2 after electrodeposition. Depositions after 30 s applied voltage yielded a mass deposition of 29.16 mg/cm$^2$. This example demonstrates that the carbon-coated foil allowed for retention of that deposited coating weight after the rinse.

Example 5

Electrodeposition and Drawdown Comparison for Nickel Manganese Cobalt Electrochemically Active Material Preparation of a dispersant: The dispersant was prepared using a two-step process. In a first step, 493.2 grams of diacetone alcohol was added to a four-neck round bottom flask equipped with a mechanical stir blade, thermocouple, and reflux condenser. The diacetone alcohol was heated to a set point of 122° C. under a nitrogen atmosphere. A monomer solution containing 290.4 grams of methyl methacrylate, 295 grams of ethylhexyl acrylate, 51.5 grams of butyl acrylate, 187.3 grams of N-vinyl pyrrolidone, and 112.4 grams of methacrylic acid was thoroughly mixed in a separate container. An initiator solution of 9.1 grams of tert-amyl peroctoate and 163.8 grams of diacetone alcohol was also prepared in a separate container. The initiator and monomer solutions were co-fed into the flask at the same time using addition funnels over 210 and 180 minutes, respectively. After the initiator and monomer feeds were complete, the monomer addition funnel was rinsed with 46.8 grams of diacetone alcohol and the initiator addition funnel was rinsed with 23 grams of diacetone alcohol. The resulting solution was held at 122° C. for 1 hour. Next, 200 grams of diacetone alcohol was added to the reactor followed by a second initiator solution of 2.8 grams of tert-amyl peroctoate and 24.5 grams of diacetone alcohol which was added over 30 minutes. The solution was held at 122° C. for 60 minutes. Then a third initiator solution of 2.8 grams of tert-amyl peroctoate and 24.5 grams of diacetone alcohol was added over 30 minutes. The solution was then held at 122° C. for 60 minutes. After the 60-minute hold, the solution was cooled to less than 100° C. and poured into a suitable container. The total solids content of the composition was measured to be 52.74% solids.

In a second step, 462 grams of above composition from step 1 was added to a four-neck round bottom flask equipped with a mechanical stir blade, thermocouple, and reflux condenser. The solution was heated to a set point of 100° C. under a nitrogen atmosphere. Next, 32.8 grams of dimethyl ethanolamine was added over 10 min. After the addition, the solution was held at 100° C. for 15 min and then cooled to 70° C. Once the solution reached 70° C., 541.5 grams of warm (70° C.) deionized water was added over 60 minutes and was mixed for 15 minutes. After mixing, the dispersant was poured into a suitable container. The total solids content of the dispersant composition was measured to be 22.9% solids.

Solids contents of the compositions were determined by the following procedure: An aluminum weighing dish from Fisher Scientific, was weighed using an analytical balance. The weight of the empty dish was recorded to four decimal places. Approximately 0.5 g of the composition and 3.5 g of acetone was added to the pre-weighed dish. The weight of the dish and the dispersant solution was recorded to four decimal places. The dish containing the dispersant solution was placed into a laboratory oven, with the oven temperature set to 110° C. and dried for 1 hour. The pre-weighed dish with remaining solid material was weighed using an analytical balance. The weight of the dish with remaining solid material was recorded to four decimal places. The solids content was determined using the following equation: % solids=100×[(weight of the dish with remaining solids)−(weight of the empty dish)]/[(weight of the dish composition prior to heating)−(weight of the empty dish)].

Preparation of a PVDF dispersion: 96.27 grams of deionized water, 121.85 grams (27.79 grams of solid material) of the dispersant composition prepared above, and 0.16 grams of a de-foaming agent (Drewplus™) were combined in a plastic cup. The resultant mixture was stirred vigorously using a Cowles blade while maintaining a modest vortex at 1200 RPMs. The mixing was continued while 64.8 grams of polyvinylidene difluoride powder (RZ-49 available from Asambly Chemical) was added in small portions of about 0.5 grams over 5 minutes. Mixing was continued for an additional 45 minutes after all the polyvinylidene difluoride powder was added.

Preparation and electrodeposition of electrodepositable coating composition: To plastic cup was added 5.241 g of a pH-dependent rheology modifier (ACRYSOL ASE 60 from DOW Chemical, 1.5 g of solid material, 1.8 wt. % of total solids), 4.485 g of waterborne PVDF dispersion (1.02 g fluoropolymer solids, 1.3% by weight of total solids; 0.44 g dispersant solids, 0.5% by weight of total solids), 65 g of water, and 0.815 g of a crosslinking agent (CARBODILITE V-02-L2, 0.33 g solids, 0.4wt. %). This mixture was mixed in a centrifugal mixer at 2000 RPMS for 5 minutes. Next, 75 g (92 wt. %) of a nickel manganese cobalt 622 positive electrochemically active material was added to the mixture and mixed in centrifugal mixture at 2000 RPMS for 5 minutes. Next, 3.261 g (4 wt. %) of carbon black material (SUPER P, from available from Imerys) was added to the mixture and mixed in a centrifugal mixer at 2000 RPMs for 5 minutes. Finally, 3.0 g of Hexyl CELLOSOLVE from DOW Chemical was added to the slurry and mixed in a centrifugal mixer at 2000 RPMs for 5 minutes. Approximately ~10 g of slurry was used to complete a drawdown coating using 140 um drawdown doctor blade at a transverse speed of 20 in/min. The remainder of the slurry was then diluted to 10% total solids by the addition of 670 g of water under constant stir. After 30 minutes of stirring, electrocoat was performed. A 7.5 cm×8 cm carbon-coated aluminum foil (acquired from MTI, Item number: EQ-CC-Al-18u-260) was used as the electrical current collector. The non-treated portion of the aluminum foil had a thickness of about 15 microns and a width of 2 cm that ran along the edge for the entire length of the 8 cm aluminum foil (approx. surface area of 16 cm²), and the carbon-based primer covered the remainder of the surface with a coating approximately 1-2 microns thick (approx. surface area of 48 cm²). An application of 100V was applied to the foil immersed 8 cm into the electrodepositable coating composition yielding 6.07 mg/cm².

Figure 2A:
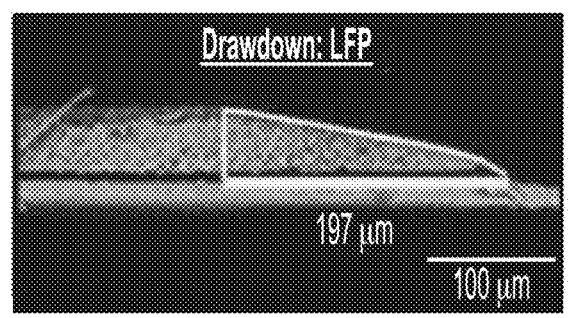
FIG. 2a is a micrograph of a coated electrical current collector coated by a drawdown method.
Figure 2B:
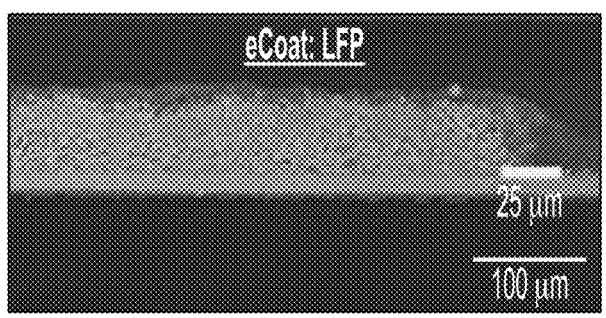
FIG. 2b is a micrograph of a coated electrical current collector coated by electrodeposition followed by a water rinse.

The resulting coated foils were then analyzed according to the EDGE ANGLE MEASUREMENT METHOD. Small square sections were cut from each sample with a surgical prep blade and placed on aluminum stubs with carbon tape. Samples were then coated with Au/Pd for 60 seconds and analyzed in the Quanta 250 FEG SEM under high vacuum. The accelerating voltage was set to 20.00 kV and the spot size was 3.0. Micrographs of the resulting coated foils are shown in FIGS. 2a and 2b. FIG. 2a is the foil coated by the drawdown method. The slope length is 197 nm with a total coating thickness of 75 nm, wherein the ratio of the length of the slope to the thickness of the treatment layer and electrodeposited coating layer of the slope is 2.63:1 and the sloped edge has an angle measured from the surface of the electrical current collector of 20.8°, each as measured by the EDGE ANGLE MEASUREMENT TEST METHOD. In contrast, the FIG. 2b is the foil coated by electrodeposition followed by a water rinse. The slope length is 25 nm with a total coating thickness of 75 nm, wherein the ratio of the length of the slope to the thickness of the treatment layer and electrodeposited coating layer of the slope is 0.75:1 and the sloped edge has an angle measured from the surface of the electrical current collector of 71.6°, each as measured by the EDGE ANGLE MEASUREMENT TEST METHOD. These examples show a significantly sharper edge and shorter sloped section for the electrode coated by electrodeposition compared to the electrode coated by the drawdown method.

Example 6

Electrodeposition and Drawdown Comparison for Lithium Iron Phosphate Electrochemically Active Material To a plastic cup was added 12.60 g of a pH-dependent rheology modifier (ACRYSOL HASE TT-615 from DOW Chemical, 3.75 g of solid material, 4.50 wt. % of total solids), 65.87 g of water, and 1.042 g of a crosslinking agent (CARBODILITE V-02-L2, available from Nisshinbo Chemical Inc., 0.42 g solid material, 0.50 wt. % of total solids). This mixture was mixed in a centrifugal mixer at 2000 RPMs for 5 minutes. Next, 75.0 g (90 wt. % of total solids) of Lithium Iron Phosphate positive electrode electrochemically active material acquired from Gelon was added to the mixture and mixed in centrifugal mixer at 2000 RPMs for 5 minutes. Next, 4.17 g (5.0 wt. %) of carbon black (SUPER P, from available from Imerys, 4.0 wt. % of total solids) was added to the mixture and mixed in a centrifugal mixer at 2000 RPMs for 5 minutes. Finally, 9.0 g of Hexyl CELLOSOLVE glycol ether from DOW Chemical was added to the slurry and mixed in a centrifugal mixer at 2000 RPMs for 5 minutes. Approximately ~10 g of slurry was used to complete using 140 um drawdown doctor blade at a transverse speed of 20 in/min. Then the remaining slurry was slurry was diluted to 10% total solids by the addition of 670.0 g of water under constant stirring. After 30 minutes of stirring, electrocoat was performed. An application of 100V was applied to a 7.5 cm×8 cm carbon-coated aluminum foil as described in Example 5 (acquired from MTI) immersed 8 cm into the electrodepositable coating composition yielding 11.60 mg/cm².

Figure 3A:
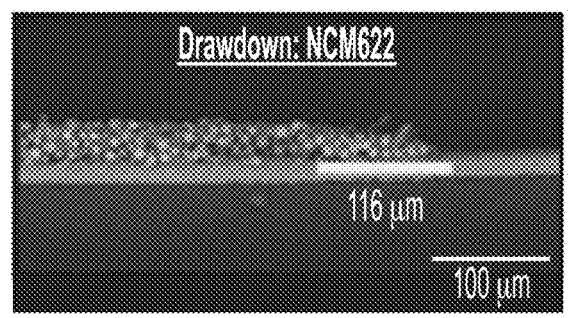
FIG. 3a is a micrograph of a coated electrical current collector coated by a drawdown method.
Figure 3B:
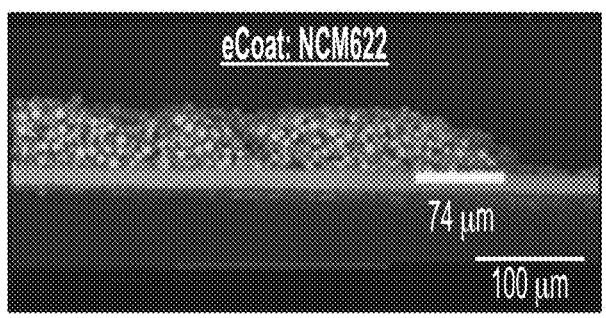
FIG. 3b is a micrograph of a coated electrical current collector coated by electrodeposition followed by a water rinse.

The resulting coated foils were then analyzed according to the EDGE ANGLE MEASUREMENT METHOD. Small square sections were cut from each sample with a surgical prep blade and placed on aluminum stubs with carbon tape. Samples were then coated with Au/Pd for 60 seconds and analyzed in the Quanta 250 FEG SEM under high vacuum. The accelerating voltage was set to 20.00 kV and the spot size was 3.0. Micrographs of the resulting coated foils are shown in FIGS. 3a and 3b. FIG. 3a is the foil coated by the drawdown method. The slope length is 116 nm with a total coating thickness of 75 nm, wherein the ratio of the length of the slope to the thickness of the treatment layer and electrodeposited coating layer of the slope is 1.55:1 and the sloped edge has an angle measured from the surface of the electrical current collector of 32.9°, each as measured by the EDGE ANGLE MEASUREMENT TEST METHOD. In contrast, the FIG. 3b is the foil coated by electrodeposition followed by a water rinse. The slope length is 74 nm with a total coating thickness of 75 nm, wherein the ratio of the length of the slope to the thickness of the treatment layer and electrodeposited coating layer of the slope is 1:1 and the sloped edge has an angle measured from the surface of the electrical current collector of 45.4°, each as measured by the EDGE ANGLE MEASUREMENT TEST METHOD. These examples show a significantly sharper edge and shorter sloped section for the electrode coated by electrodeposition compared to the electrode coated by the drawdown method.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:
1. A method of coating an electrical current collector comprising:
   treating a portion of a surface of the electrical current collector with an adhesion promoting composition to deposit a treatment layer over the portion of the surface of the electrical current collector, wherein the resulting surface of the electrical current collector comprises (a)

a treated portion comprising the treatment layer and (b) a non-treated portion that lacks the treatment layer;

electrodepositing an electrodeposited coating layer from an electrodepositable coating composition onto the surface of the electrical current collector to form a coated electrical current collector; and rinsing the coated electrical current collector, wherein the electrodeposited coating layer substantially adheres to the treated portion of the surface and does not adhere to the non-treated portion of the surface.

2. The method of coating an electrical current collector of claim 1, wherein the electrical current collector comprises aluminum, copper, steel, stainless steel, nickel, or combinations thereof.

3. The method of coating an electrical current collector of claim 1, wherein the adhesion promoting composition comprises a conductive primer coating composition, and the treatment layer comprises a conductive primer coating layer.

4. The method of coating an electrical current collector of claim 3, wherein the conductive primer coating composition comprises a carbon-based conductive primer coating composition, and the conductive primer coating layer comprises a carbon-based conductive primer coating layer.

5. The method of coating an electrical current collector of claim 1, wherein the adhesion promoting composition comprises a pretreatment composition, and the treatment layer comprises a pretreatment layer.

6. The method of coating an electrical current collector of claim 1, wherein electrodepositing the electrodeposited coating layer comprises:

at least partially immersing the electrical current collector into a bath comprising the electrodepositable coating composition; and electrodepositing a coating deposited from the electrodepositable coating onto at least a portion of the surface of the electrical current collector immersed in the bath.

7. The method of coating an electrical current collector of claim 1, wherein the electrodepositable coating composition comprises an electrochemically active material and an electrodepositable binder comprising a pH-dependent rheology modifier, and the electrodeposited coating layer comprises the electrochemically active material and the electrodepositable binder.

8. The method of coating an electrical current collector of claim 7, wherein the electrodepositable binder further comprises a fluoropolymer, a non-fluorinated organic film-forming polymer, a dispersant, or combinations thereof.

9. The method of coating an electrical current collector of claim 7, wherein the electrodepositable binder further comprises a crosslinking agent.

10. The method of coating an electrical current collector of claim 7, wherein the electrochemically active material comprises $LiCoO_2$, $LiNiO_2$, $LiFePO_4$, $LiFeCoPO_4$, $LiCoPO_4$, $LiMnO_2$, $LiMn_2O_4$, $Li(NiMnCo)O_2$, $Li(NiCoAl)O_2$, carbon-coated $LiFePO_4$, sulfur, sulfur compounds, $LiO_2$, $FeF_2$ and $FeF_3$, aluminum, SnCo, $Fe_3O_4$, or combinations thereof.

11. The method of coating an electrical current collector of claim 7, wherein the electrochemically active material comprises graphite, lithium titanate, lithium vanadium phosphate, silicon, silicon compounds, tin, tin compounds, lithium metal, graphene, or a combination thereof.

12. The method of coating an electrical current collector of claim 7, wherein the electrodepositable coating composition further comprises an electrically conductive agent.

13. An electrode comprising:

an electrical current collector having a surface;

a treatment layer on a portion of the surface of the electrical current collector, wherein (a) a portion of the surface of the electrical current collector comprises the treatment layer and (b) a portion of the surface of the electrical current collector lacks the treatment layer; and an electrodeposited coating layer that is present over the treatment layer and is not present over the portion of the surface of the electrical current collector lacks the treatment layer.

14. The electrode of claim 13, wherein the non-treated portion of the surface of the electrical current collector is substantially free of the electrodeposited coating layer.

15. The electrode of claim 13, wherein the electrode is produced by the method of coating an electrical current collector of claim 1.

16. The electrode of claim 13, wherein the combined thickness of the treatment layer and electrodeposited coating layer is from 0.5 microns to 1,000 microns.

17. The electrode of claim 13, wherein the treatment layer and electrodeposited coating layer form a sloped edge having an angle measured from the surface of the electrical current collector of at least 35°, as measured by the EDGE ANGLE MEASUREMENT TEST METHOD.

18. The electrode of claim 13, wherein an edge of the treatment layer and electrodeposited coating layer is sloped and the ratio of the length of the slope to the thickness of the treatment layer and electrodeposited coating layer of the slope is at least 0.5:1, as measured by the EDGE ANGLE MEASUREMENT TEST METHOD.

19. The electrode of claim 13, wherein the electrodeposited coating layer comprises LFP and an edge of the treatment layer and electrodeposited coating layer is sloped and the ratio of the length of the slope to the thickness of the treatment layer and electrodeposited coating layer of the slope is from 0.5:1 to 2.4:1, as measured by the EDGE ANGLE MEASUREMENT TEST METHOD.

20. The electrode of claim 13, wherein the electrodeposited coating layer comprises NMC and an edge of the electrodeposited coating layer is sloped and the ratio of the length of the slope to the thickness of the treatment layer and electrodeposited coating layer of the slope is from 0.7:1 to 1.4:1, as measured by the EDGE ANGLE MEASUREMENT TEST METHOD.

21. The electrode of claim 13, wherein the electrical current collector comprises aluminum, copper, steel, stainless steel, nickel, or combinations thereof.

22. The electrode of claim 13, wherein the electrodeposited coating layer comprises an electrochemically active material and an electrodepositable binder comprising a pH-dependent rheology modifier.

23. The electrode of claim 22, wherein the electrodepositable binder further comprises a fluoropolymer, a non-fluorinated organic film-forming polymer, a dispersant, or combinations thereof.

24. The electrode of claim 22, wherein the electrodepositable binder further comprises a crosslinking agent.

25. The electrode of claim 19, wherein the electrodeposited coating layer further comprises an electrically conductive agent.

26. The electrode of claim 13, wherein the electrodeposited coating layer is crosslinked.

27. The electrode of claim 13, wherein the electrode comprises a positive electrode.

28. The electrode of claim 13, wherein the electrode comprises a negative electrode.

29. An electrical storage device comprising:
(a) electrode of claim 13;
(b) a counter-electrode; and
(c) an electrolyte.

30. The electrical storage device of claim 29, wherein the electrical storage device comprises a cell.

31. The electrical storage device of claim 29, wherein the electrical storage device comprises a battery pack.

32. The electrical storage device of claim 29, wherein the electrical storage device comprises a secondary battery.

33. The electrical storage device of claim 29, wherein the electrical storage device comprises a capacitor.

34. The electrical storage device of claim 29, wherein the electrical storage device comprises a supercapacitor.

\* \* \* \* \*